(12) United States Patent
Arad et al.

(10) Patent No.: US 11,701,831 B2
(45) Date of Patent: Jul. 18, 2023

(54) METHOD AND SYSTEM FOR RENDERING DATA FOR ADDRESSABLE DISPENSING

(71) Applicant: Stratasys Ltd., Rehovot (IL)

(72) Inventors: Nur Arad, Tel-Aviv (IL); Ore Shtalrid, Yavne (IL); Yossi Koren, Jerusalem (IL); Blake Zachary Courter, Reading, MA (US); Stephen Demai, Cambridge, MA (US)

(73) Assignee: Stratasys Ltd., Rehovot (IL)

( * ) Notice: Subject to any disclaimer, the term of this patent is extended or adjusted under 35 U.S.C. 154(b) by 462 days.

(21) Appl. No.: 16/642,900

(22) PCT Filed: Aug. 27, 2018

(86) PCT No.: PCT/IL2018/050946
§ 371 (c)(1),
(2) Date: Feb. 28, 2020

(87) PCT Pub. No.: WO2019/043696
PCT Pub. Date: Mar. 7, 2019

(65) Prior Publication Data
US 2020/0346411 A1    Nov. 5, 2020

Related U.S. Application Data

(60) Provisional application No. 62/551,279, filed on Aug. 29, 2017.

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/112* (2017.08); *B33Y 10/00* (2014.12); *B33Y 30/00* (2014.12); *B33Y 50/02* (2014.12)

(58) Field of Classification Search
CPC .......... B33Y 50/02; B33Y 30/00; B33Y 10/00; B29C 64/393; B29C 64/112
See application file for complete search history.

(56) References Cited

U.S. PATENT DOCUMENTS 6,259,962 B1    7/2001    Gothait
6,569,373 B2    5/2003    Napadensky
(Continued)

FOREIGN PATENT DOCUMENTS

WO    WO 2019/043696    3/2019

OTHER PUBLICATIONS

International Preliminary Report on Patentability dated Mar. 12, 2020 From the International Bureau of WIPO Re. Application No. PCT/IL2018/050946. (9 Pages).

(Continued)

*Primary Examiner* — Monica A Huson
*Assistant Examiner* — Kelsey C Grace

(57) ABSTRACT

A method of rendering data for addressable dispensing of material over a working surface, comprises: receiving input image data arranged grid-wise over a plurality of picture-elements; generating an initial map describing a distance field and having a plurality of map-elements each storing distance information corresponding to one picture-element; for each picture-element of at least a portion of the picture-elements: linearly scanning the map independently along a first axis and along a second axis, and updating a respective map-element based on values of map-elements visited during the scan. The distance field can include distances defined perpendicularly to the working surface.

16 Claims, 29 Drawing Sheets
(7 of 29 Drawing Sheet(s) Filed in Color)

(51) Int. Cl.
*B33Y 30/00* (2015.01)
*B33Y 50/02* (2015.01)
*B29C 64/112* (2017.01)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,500,846 B2 | 3/2009 | Eshed et al. |
| 9,031,680 B2 | 5/2015 | Napadensky |
| 2010/0191360 A1 | 7/2010 | Napadensky et al. |
| 2014/0324204 A1 | 10/2014 | Vidimce et al. |
| 2016/0151979 A1 | 6/2016 | Urban et al. |
| 2016/0332384 A1* | 11/2016 | De Pena ............... B33Y 50/02 |
| 2017/0015057 A1 | 1/2017 | Stevens et al. |

OTHER PUBLICATIONS

International Search Report and the Written Opinion dated Dec. 7, 2018 From the International Searching Authority Re. Application No. PCT/IL2018/050946. (16 Pages).

Sanchez et al. "Efficient Evaluation of Continuous Signed Distance to a Polygonal Mesh", Proceedings of the 28th Spring Conference on Computer Graphics, SCCG '12, XP058014007, Budmerice, Slovakia, May 2-4, 2012, p. 101-108, May 2, 2012.

Shears et al. "3D Printing Raised Relief/Topographic Maps: A Cartographically Sound Method", Mansfield University Earth Lab, XP055528599, Working Paper #1, p. 1-37, Mar. 13, 2016. p. 14-21, Figs.6-14.

Communication Pursuant to Article 94(3) EPC dated Nov. 30, 2021 From the European Patent Office Re. Application No. 18769812.1. (8 Pages).

Office Action dated Apr. 23, 2023 From the Israel Patent Office Re. Application No. 272936. (4 Pages).

* cited by examiner

METHOD AND SYSTEM FOR RENDERING DATA FOR ADDRESSABLE DISPENSING

RELATED APPLICATIONS

This application is a National Phase of PCT Patent Application No. PCT/IL2018/050946 having International filing date of Aug. 27, 2018, which claims the benefit of priority under 35 USC § 119(e) of U.S. Provisional Patent Application No. 62/551,279 filed on Aug. 29, 2017. The contents of the above applications are all incorporated by reference as if fully set forth herein in their entirety.

FIELD AND BACKGROUND OF THE INVENTION

The present invention, in some embodiments thereof, relates to data rendering and, more particularly, but not exclusively, to a method and system for addressable dispensing of, for example, ink or building material.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device. Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846 and 9,031,680, all by the same Assignee, and being hereby incorporated by reference in their entirety.

SUMMARY OF THE INVENTION

According to an aspect of some embodiments of the present invention there is provided a method of rendering data for addressable dispensing of material over a working surface. The method comprises: receiving input image data arranged grid-wise over a plurality of picture-elements; generating an initial map describing a distance field and having a plurality of map-elements each storing distance information corresponding to one picture-element; for each picture-element of at least a portion of the picture-elements: linearly scanning the map independently along a first axis and along a second axis, and updating a respective map-element based on values of map-elements visited during the scan. According to some preferred embodiments of the present invention the distance field includes distances defined perpendicularly to the working surface.

According to some embodiments of the invention the generation of the initial map is by a first processor, and the scanning and the updating is by a second processor.

According to some embodiments of the invention the method wherein the first processor is a graphics processing unit (GPU) and the wherein the second processor is a central processing unit (CPU) of the same computer system.

According to some embodiments of the invention the first and the second axes are orthogonal axes.

According to some embodiments of the invention the distance information is according to a taxicab metric.

According to some embodiments of the invention the distance information is according to a Euclidian metric.

According to some embodiments of the invention the grid is a two-dimensional grid describing coordinates of picture-elements of a two-dimensional image.

According to some embodiments of the invention the generation of the initial map comprises setting one of two predetermined values for each map-element, wherein a first value of the two predetermined values is set when a respective picture-element is on a boundary of an object in the image, and a second value of the two predetermined values is set otherwise.

According to some embodiments of the invention the method comprises, for each picture-element of at least a portion of the picture-elements, designating a material to be dispensed based at least in part on a respective map-element, generating dispensing instructions readable by a controller of a printer based on the designation and transmitting the dispensing instructions to the controller.

According to some embodiments of the invention the grid is a three-dimensional grid describing coordinates of picture-elements of a three-dimensional image.

According to some embodiments of the invention the generation of the initial map comprises setting, for each map-element, a value corresponding to a height of a respective picture-element in the image, the height being along a third axis perpendicular to both the first and the second axes.

According to some embodiments of the invention the method comprises, for each picture-element of at least a portion of the picture-elements, designating a material to be dispensed based at least in part on a respective map-element, generating dispensing instructions readable by a controller of a printer, based on the designation, and transmitting the dispensing instructions to the controller.

According to some embodiments of the invention the method comprises slicing the input image data, wherein the generating, the scanning and the updating are executed separately for each slice, to form a sub-map corresponding only to picture-element of the slice.

According to some embodiments of the invention the method comprises, for at least one sub-map, designating, for each picture-element of at least a portion of picture-elements corresponding to the sub-map, a material to be dispensed based at least in part on a respective map-element of the sub-map, generating dispensing instructions readable by a controller of a printer based on the designation, and transmitting the dispensing instructions to the controller.

According to some embodiments of the invention the invention the method comprises purging the sub-map from a memory following the generation of the material bitmap.

According to some embodiments of the invention the designation is according to a modulating function.

According to some embodiments of the invention the modulating function is selected from the group consisting of a noise function, a simplex noise function, an open simplex noise function, a Worley noise function, a Perlin noise function, a wavelet noise function, a periodic function and an aperiodic function.

According to an aspect of some embodiments of the present invention there is provided a method of additive manufacturing an object. The method comprises: executing a method of rendering data for addressable dispensing of material over a working surface as delineated above and optionally and preferably as further detailed hereinbelow; and dispensing and solidifying a plurality of materials based on the dispensing instructions to sequentially form a plurality of hardened layers in a configured pattern corresponding to a shape of an object.

According to an aspect of some embodiments of the present invention there is provided a system for rendering data for addressable dispensing of material over a working surface. The system comprises: an input circuit for receiving input image data arranged grid-wise over a plurality of picture-elements; a first processor configured for generating an initial map describing a distance field and having a plurality of map-elements each storing distance information corresponding to one picture-element; and a second processor configured for linearly scanning the map, independently along a first axis and along a second axis, for each picture-element of at least a portion of the picture-elements, and for updating a respective map-element based on values of map-elements visited during the scan. According to some preferred embodiments of the present invention the distance field includes distances defined perpendicularly to the working surface.

According to some embodiments of the invention the first processor is a graphics processing unit (GPU) and the wherein the second processor is a central processing unit (CPU) of the same computer system.

According to an aspect of some embodiments of the present invention there is provided a system for three-dimensional printing of an object. The system comprises: a system for rendering data for addressable dispensing of material over a working surface as delineated above and optionally and preferably as further detailed hereinbelow; a three-dimensional fabrication apparatus having a plurality of dispensing heads configured to dispense building materials; a controller designed and constructed to receive the dispensing instructions and to operate the dispensing heads according to the material bitmap.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention.

Figure 2A:
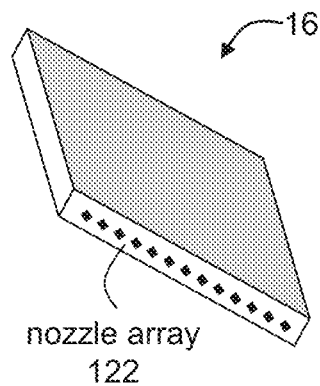
Figure 2B:
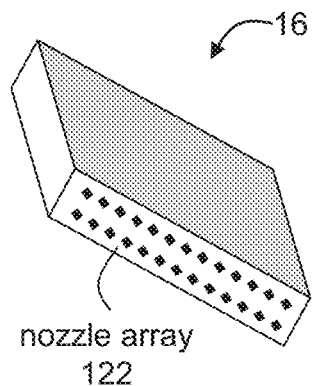
Figure 2C:
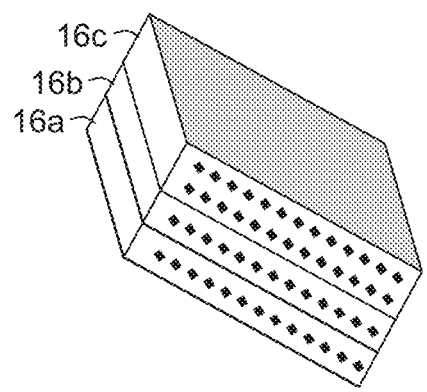

FIGS. 2A-2C are schematic illustrations of printing heads according to some embodiments of the present invention.

Figure 3A:
Figure 3B:
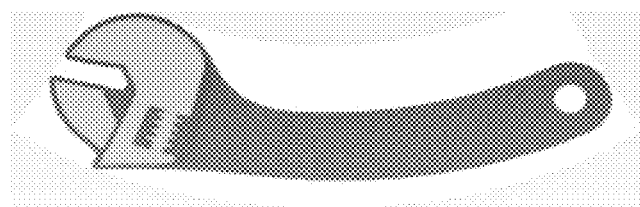

FIGS. 3A and 3B are schematic illustrations demonstrating coordinate transformations according to some embodiments of the present invention.

Figure 4:
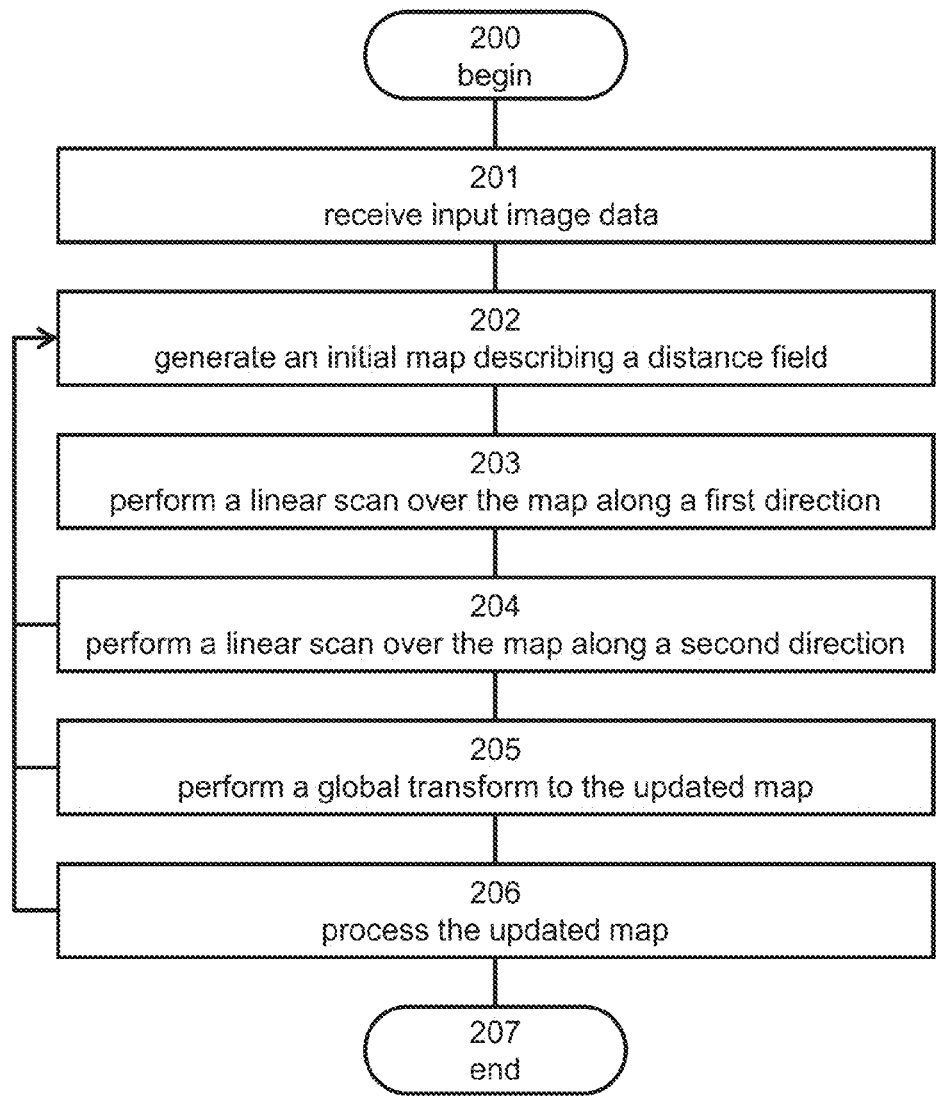

FIG. 4 is a flowchart diagram of a method particularly useful for rendering data, according to some embodiments of the present invention.

Figure 5:
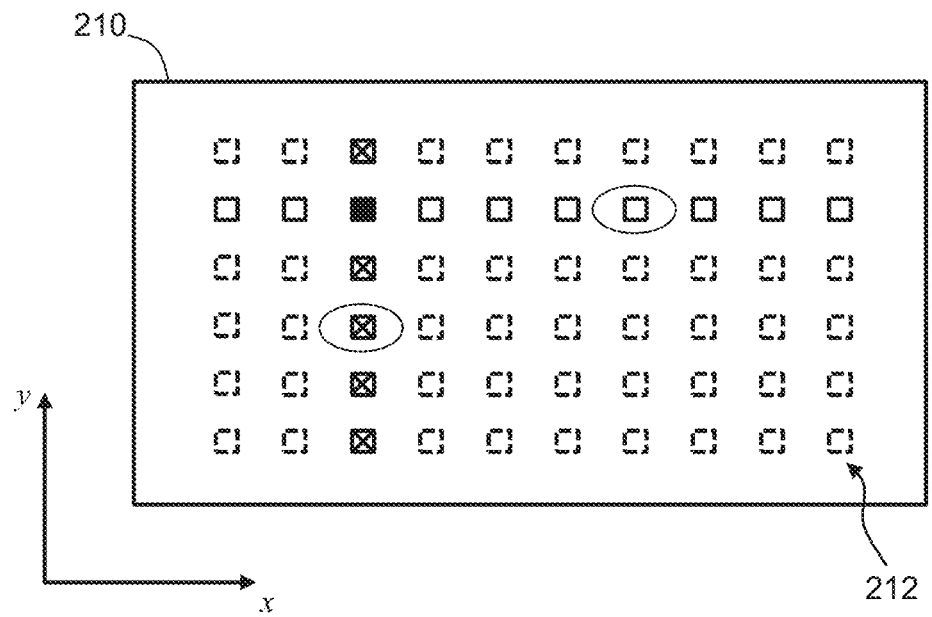

FIG. 5 is a schematic illustration of linear scanning according to some embodiments of the present invention.

Figure 6:
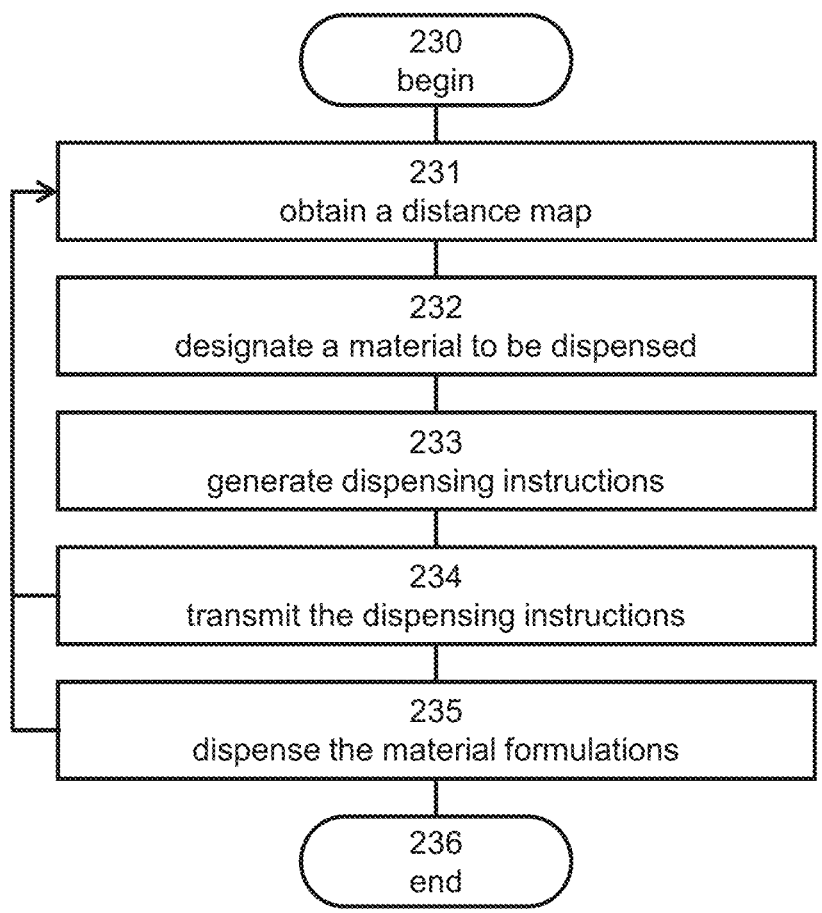

FIG. 6 is a flowchart diagram describing a method suitable for generating dispensing instructions for use by a dispensing system, according to some embodiments of the present invention.

Figure 7:
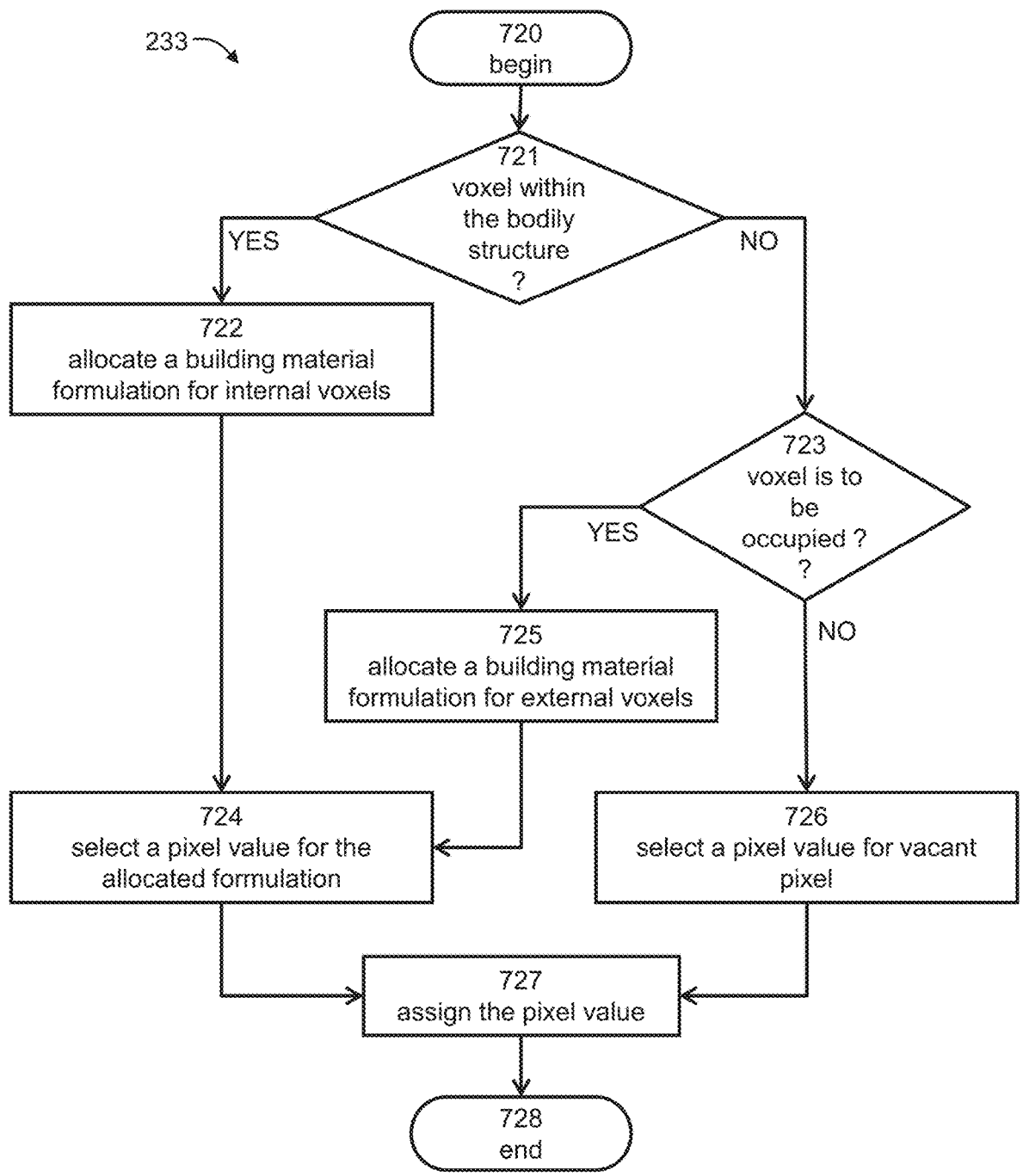

FIG. 7 is a flowchart diagram that describes a preferred procedure suitable for generating a material bitmap, according to some embodiments of the present invention.

Figure 8:
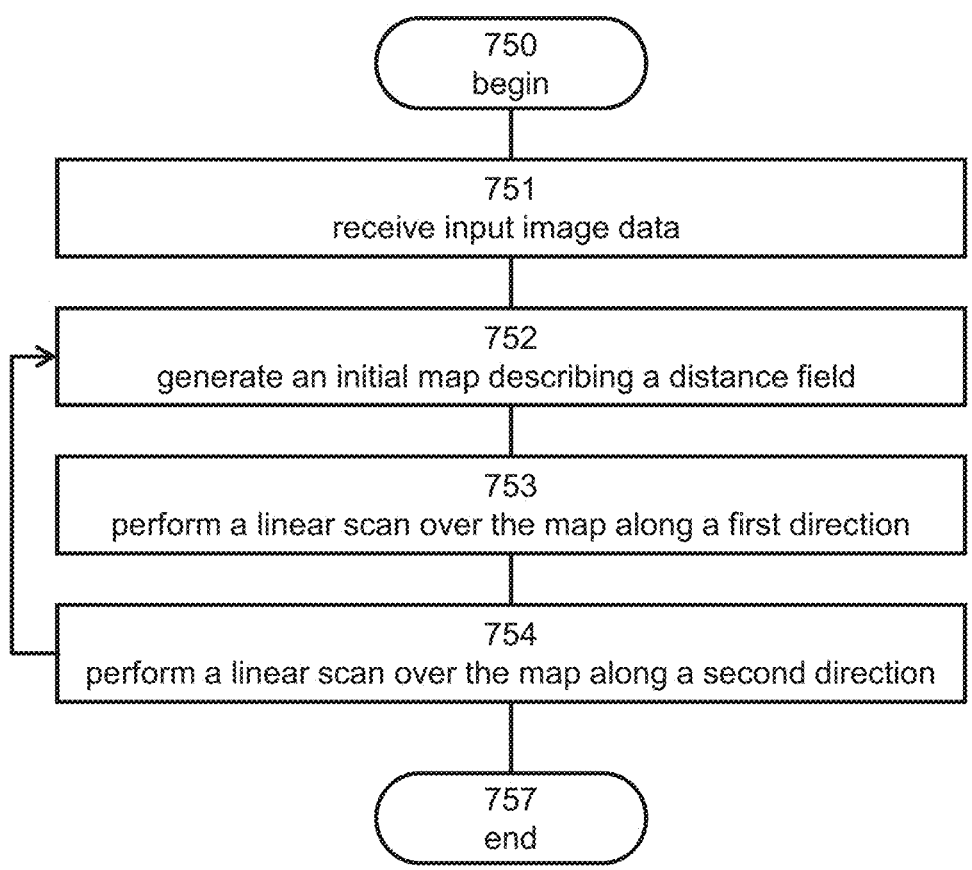

FIG. 8 is a flowchart diagram that describes a method suitable for generating a closest point map or sub-map according to some embodiments of the present invention.

Figure 9A:
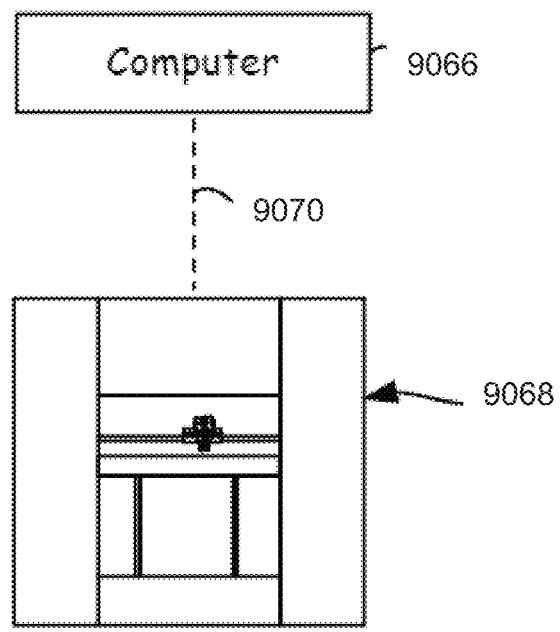
Figure 9B:
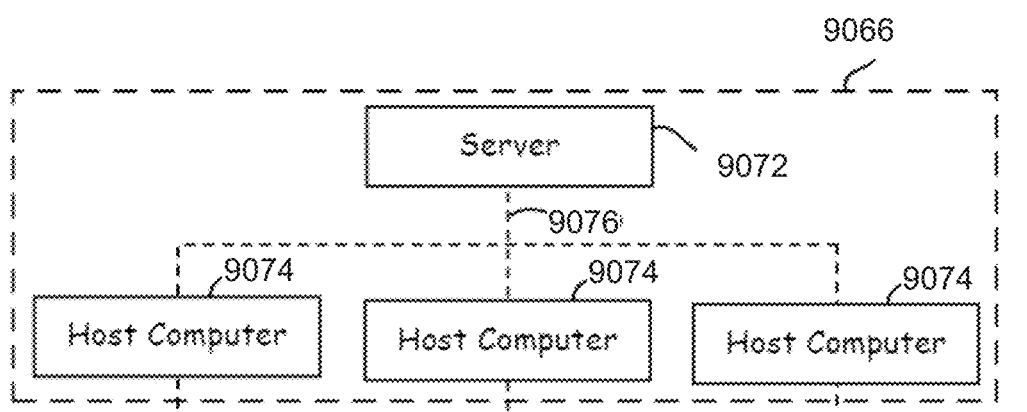
Figure 9C:
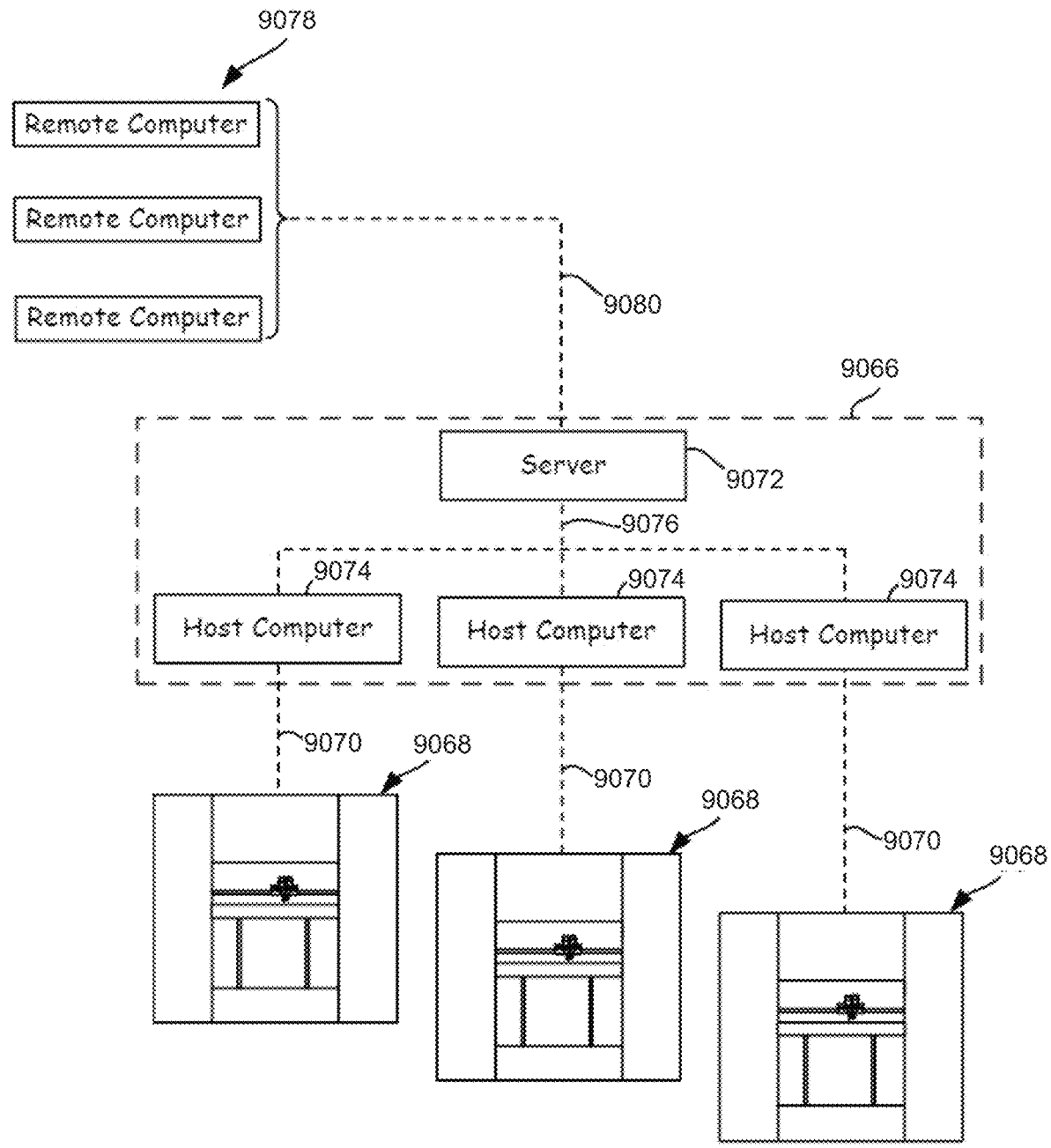

FIGS. 9A-C are schematic illustrations of systems suitable for fabricating a three-dimensional object using material assignment based on distance fields.

Figure 10:
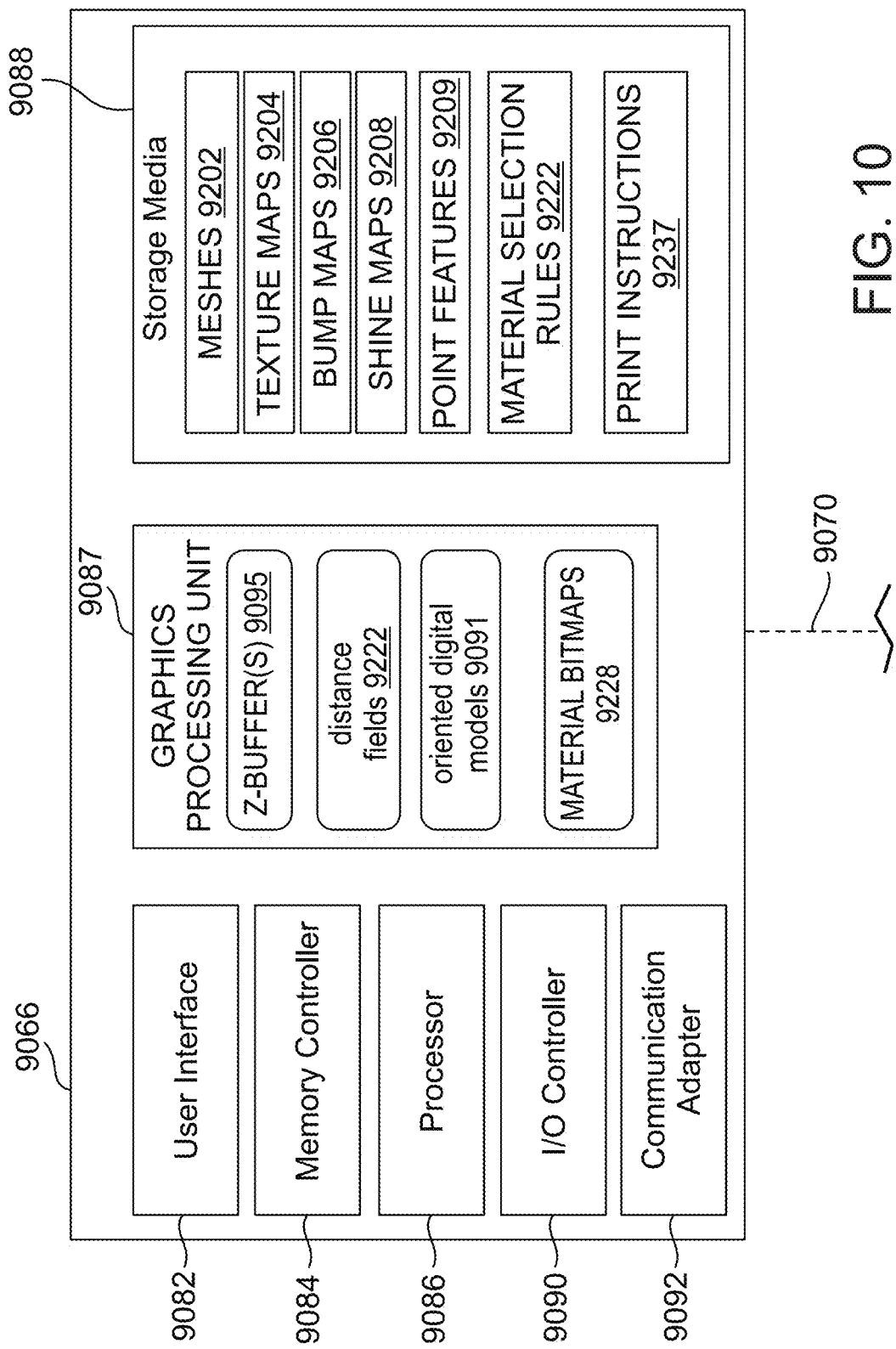

FIG. 10 is a block diagram of an example computer architecture which can be used according to some embodiments of the present invention.

Figure 11:
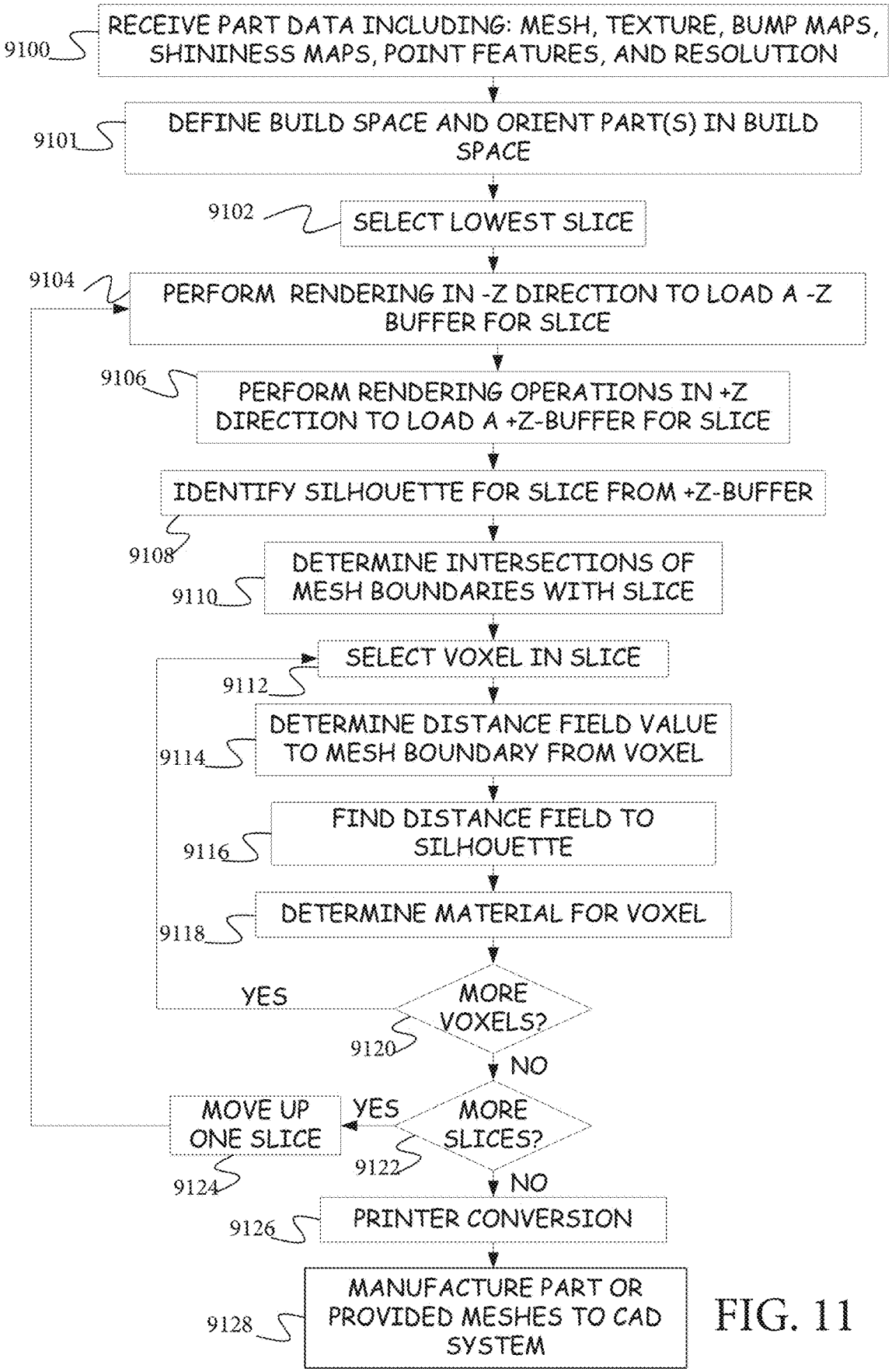

FIG. 11 is a flow diagram of a method of converting a 3D model into print instructions and printing a 3D part.

Figure 12:
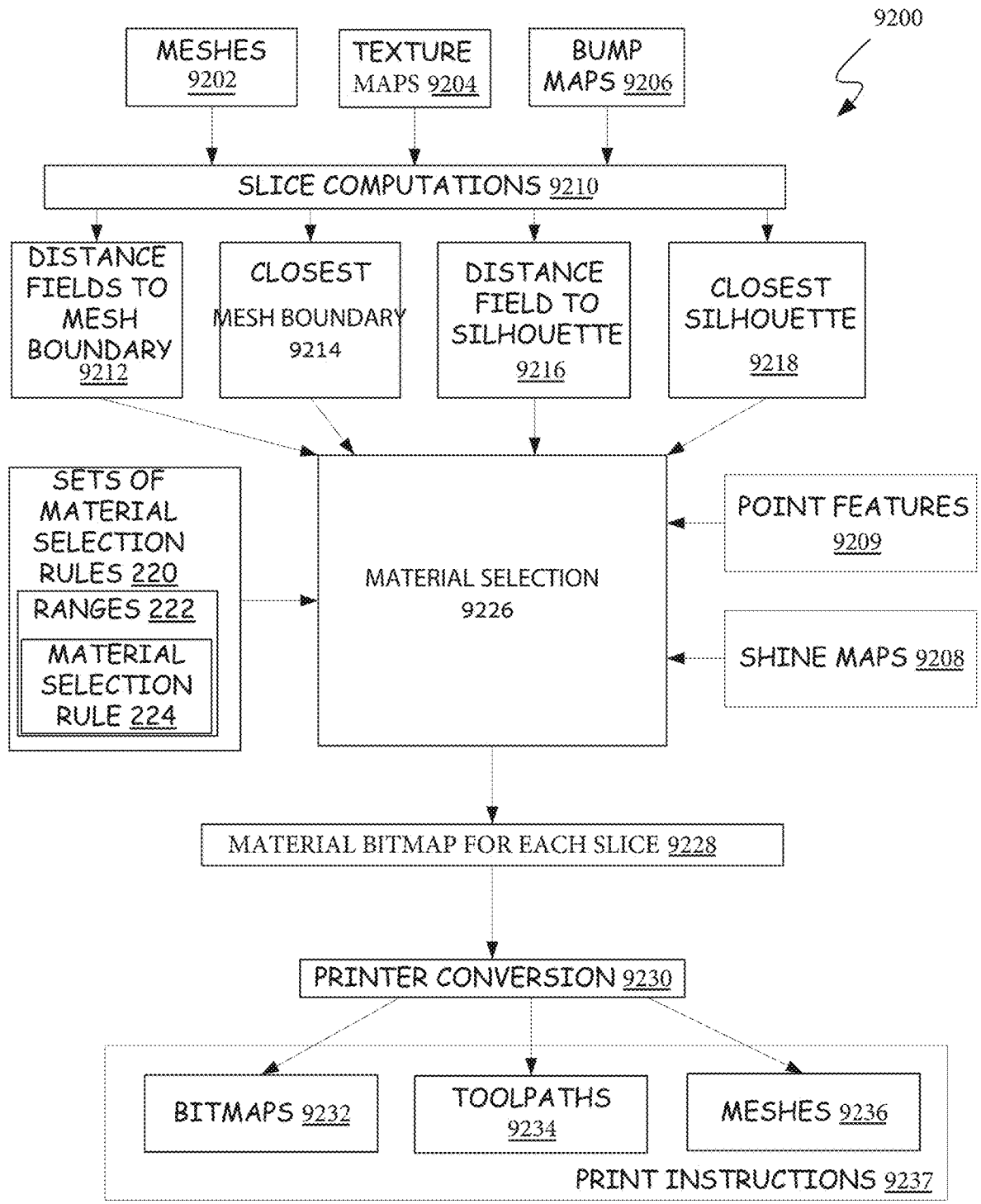

FIG. 12 is a block diagram of elements used in the method of FIG. 11.

Figure 13:
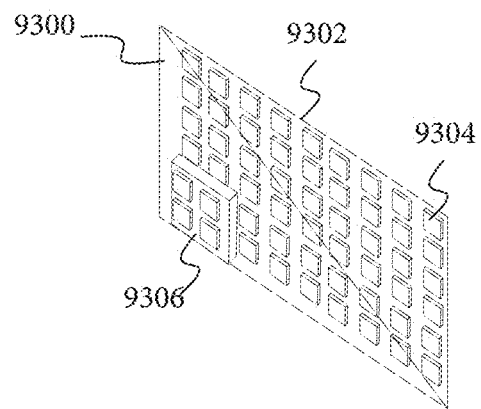

FIG. 13 is a perspective view of a portion of a part showing texture and a bump.

Figure 14:
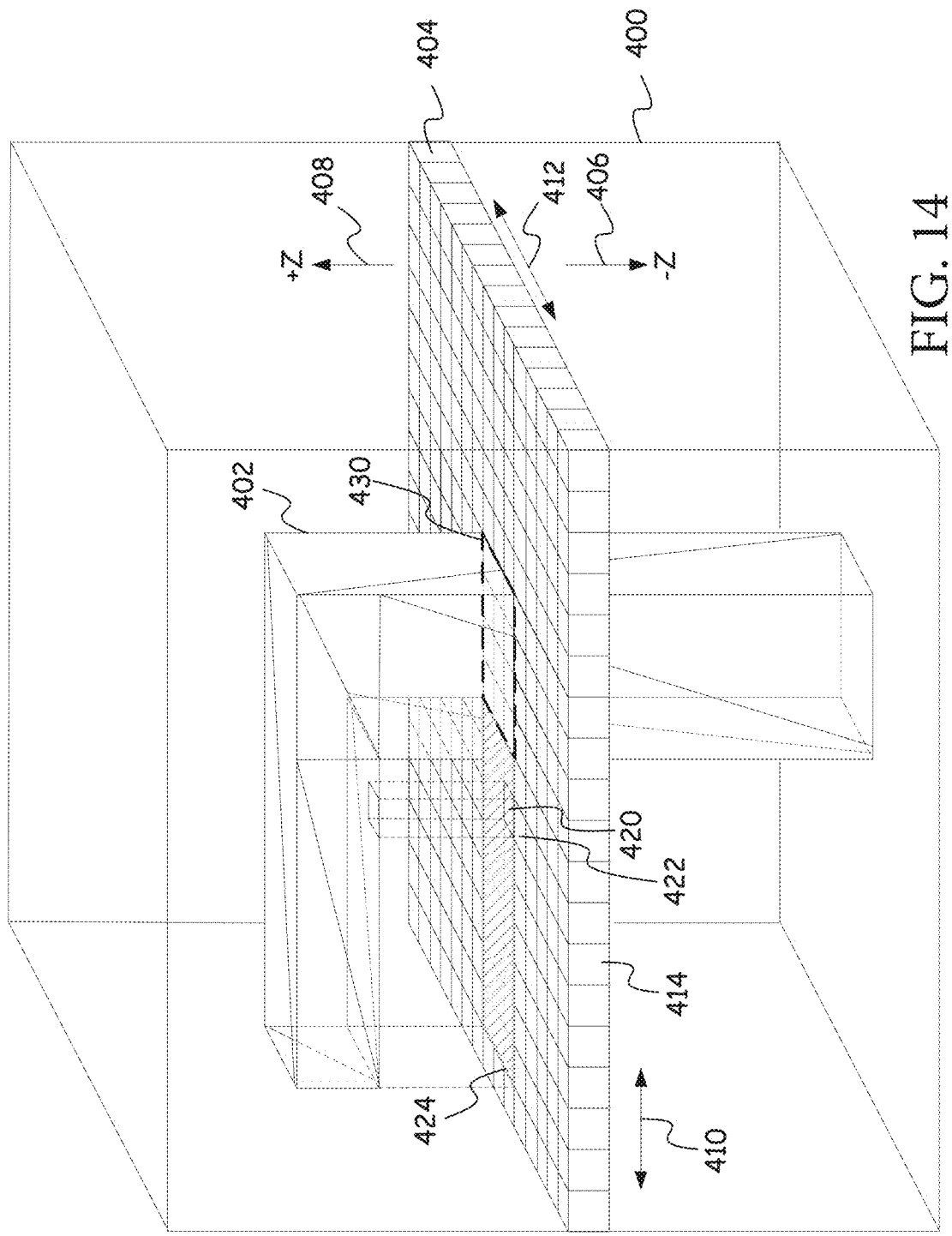

FIG. 14 is a perspective view of a build space with an oriented part.

Figure 15:
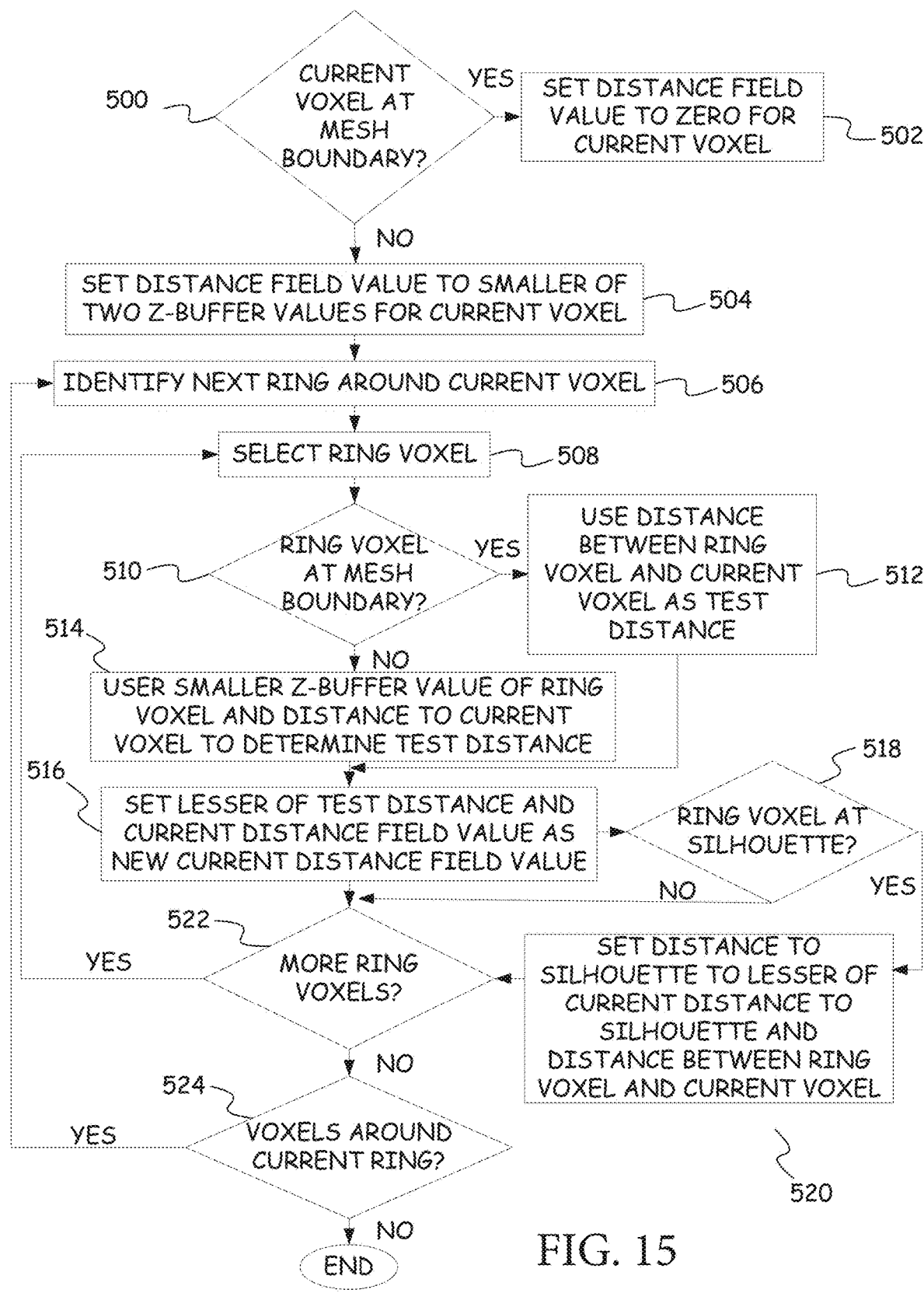

FIG. 15 is a method of determining a distance field value.

Figure 16:
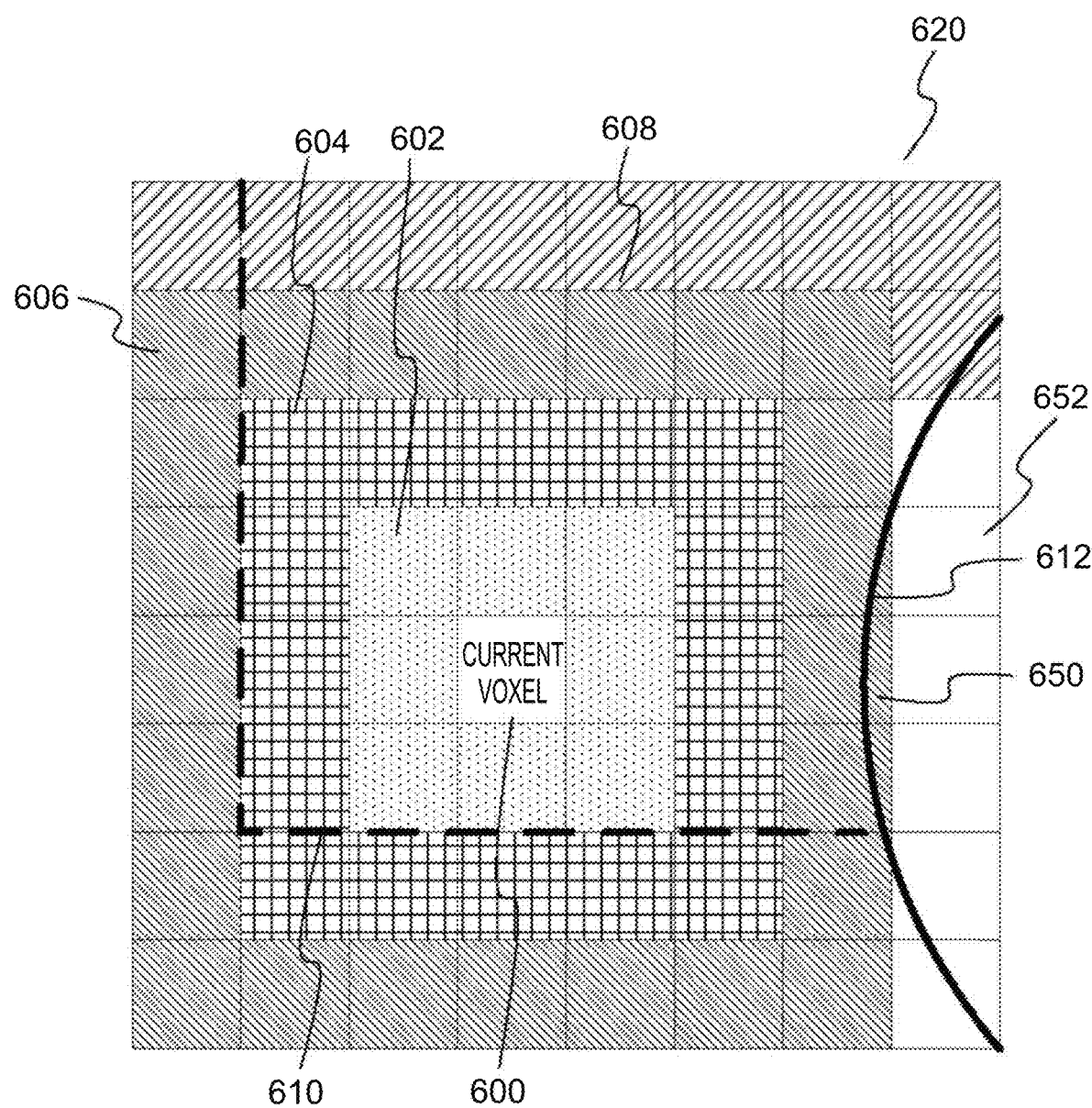

FIG. 16 is a top view of a slice in the build space showing the determination of a distance field value.

Figure 17:
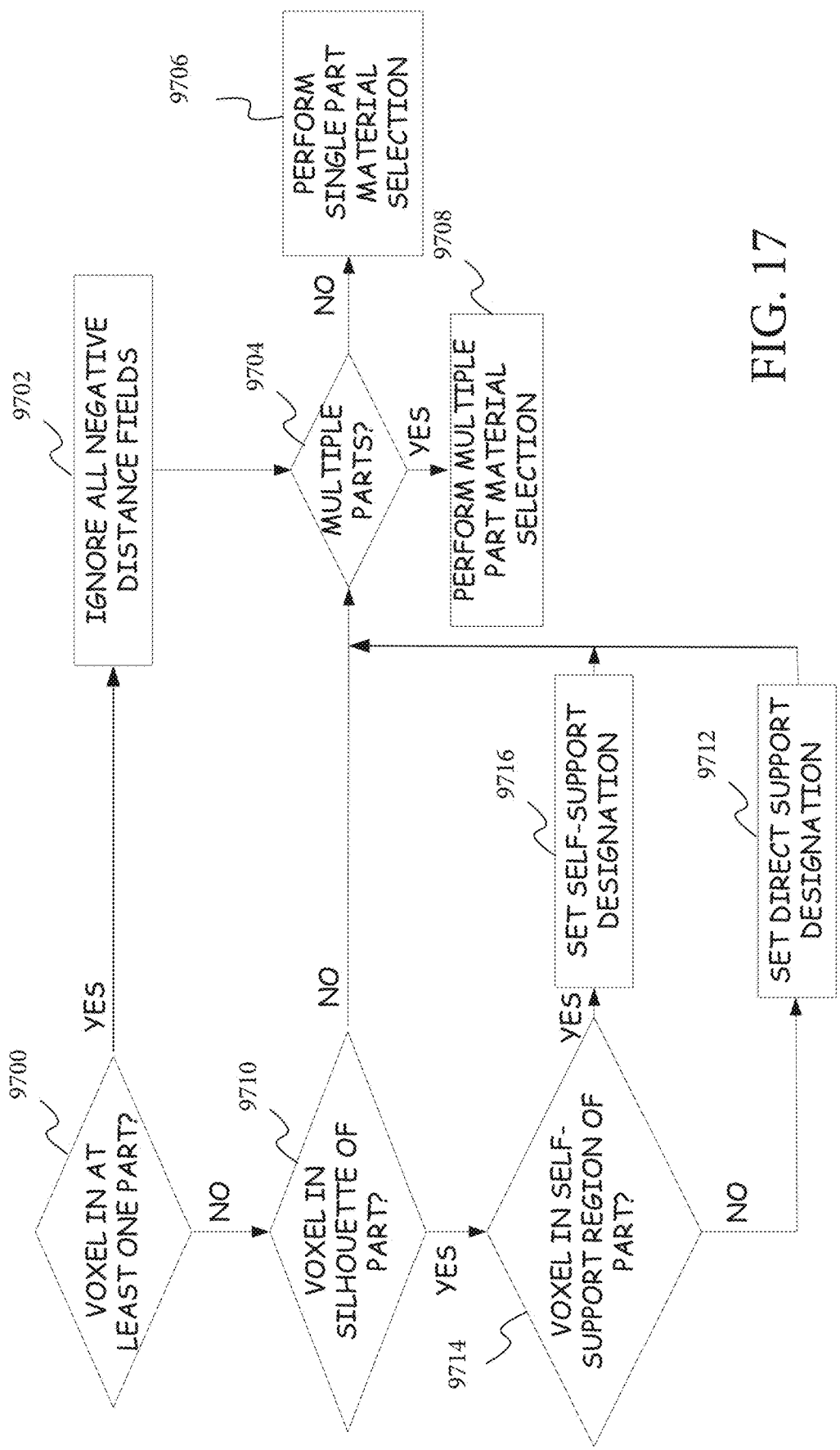

FIG. 17 is a flow diagram of a method of performing initial steps of material selection.

Figure 18:
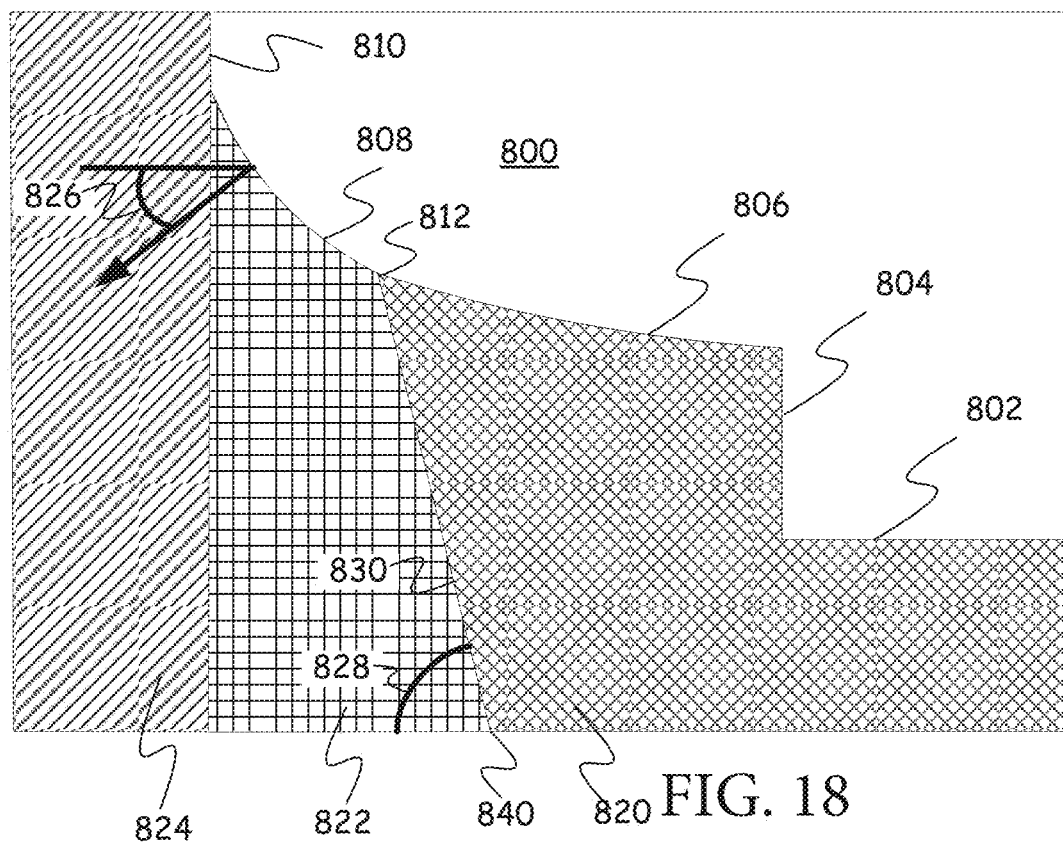

FIG. 18 provides a side view of a part showing different support regions.

Figure 19:
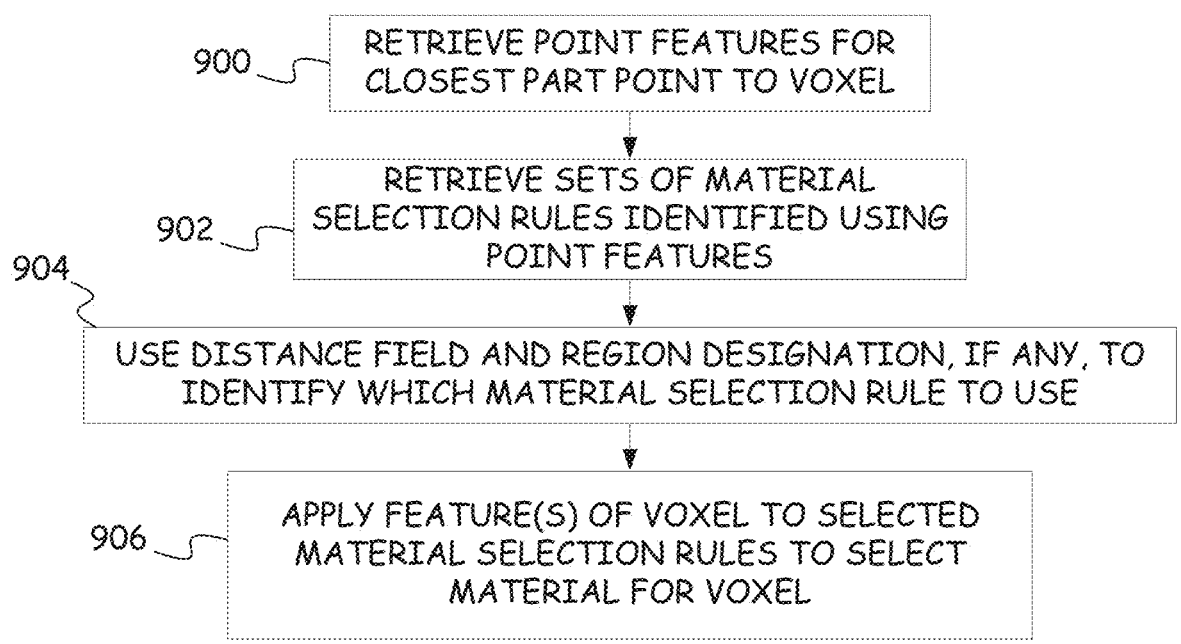

FIG. 19 provides a method of selecting a material for a voxel when there is only one part.

Figure 20:
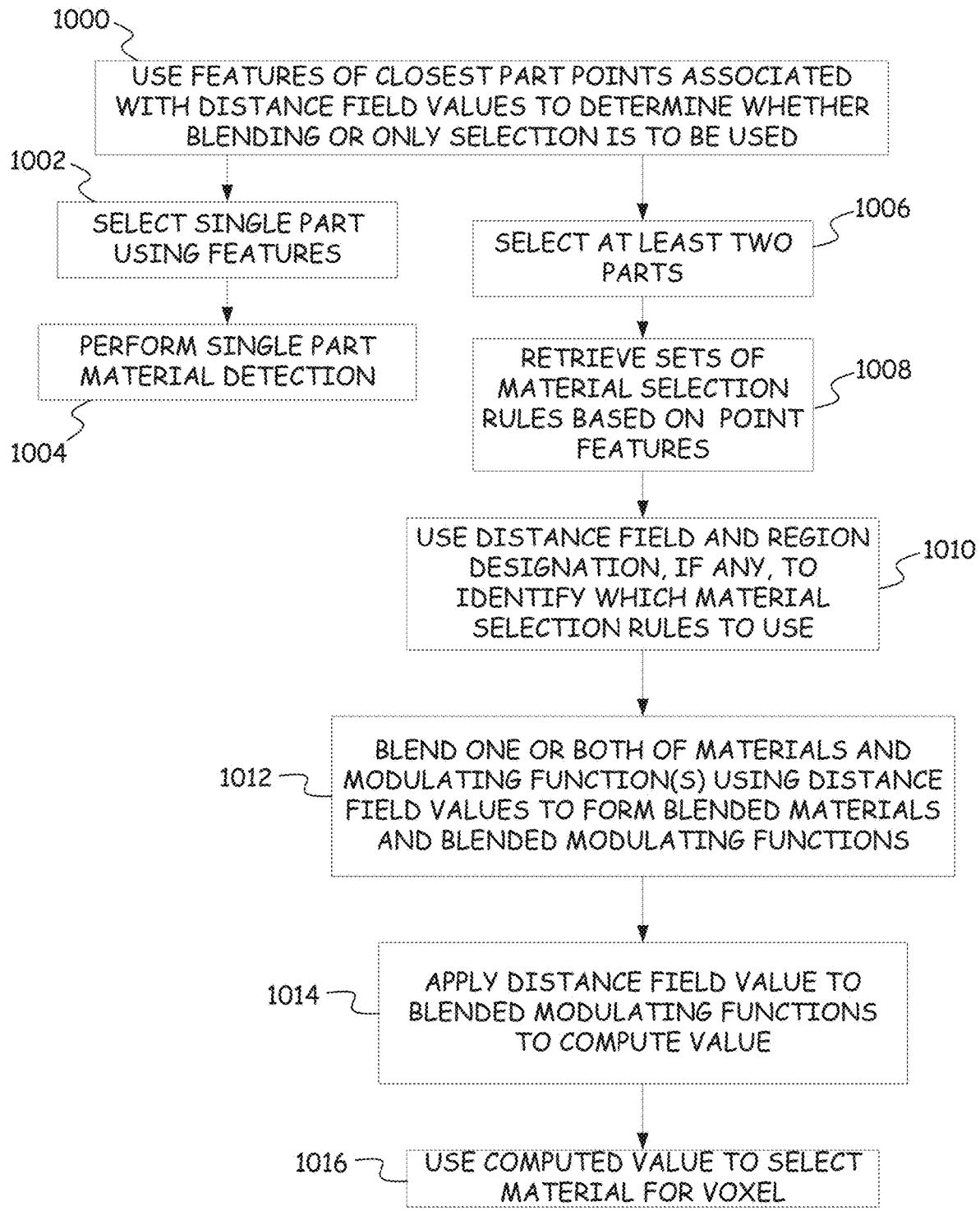

FIG. 20 provides a method of selecting a material for a voxel when there are multiple parts in the build space.

Figure 21:
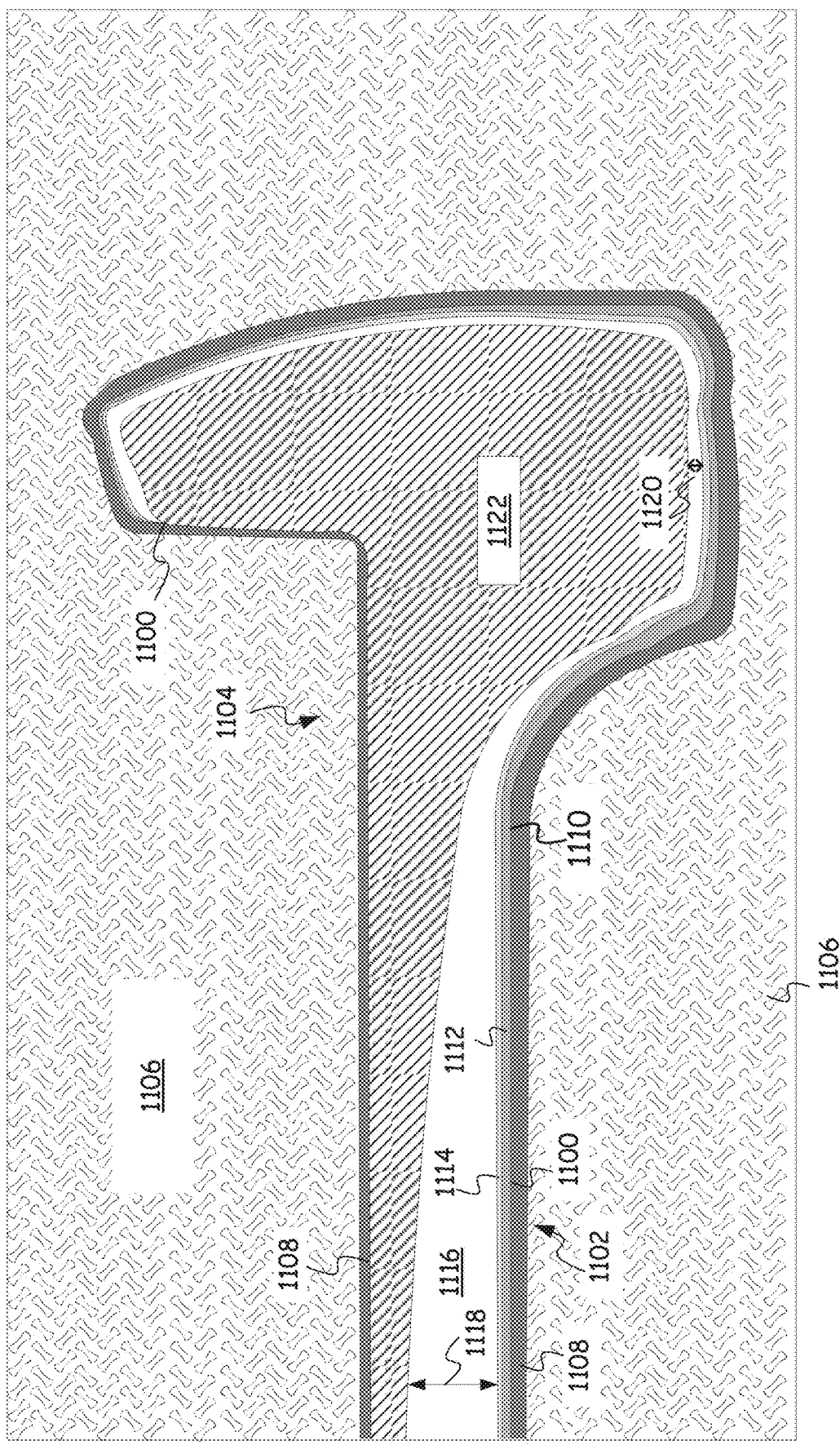

FIG. 21 provides a sectional view of a part constructed through the various embodiments showing a single part in the build space.

Figure 22:
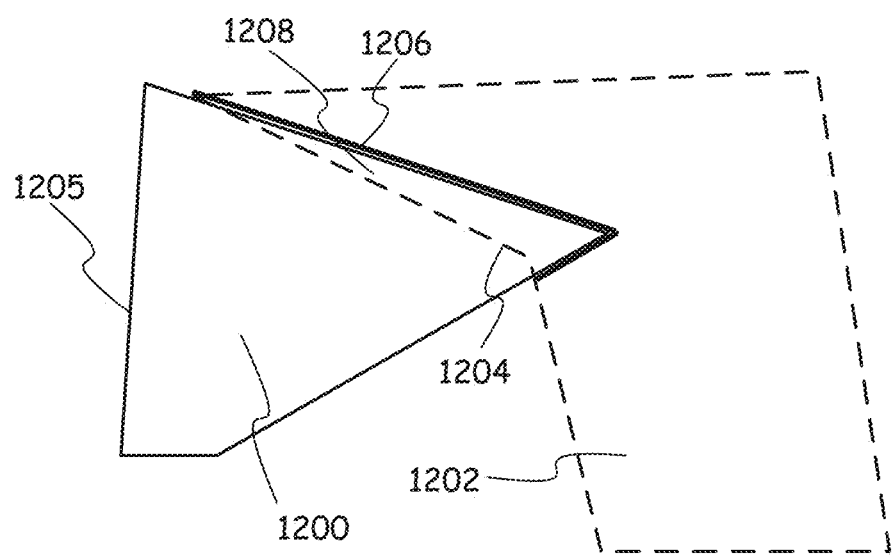

FIG. 22 provides a side view of two parts showing the removal of interference through the selection of a single part's material selection rules.

Figure 23:
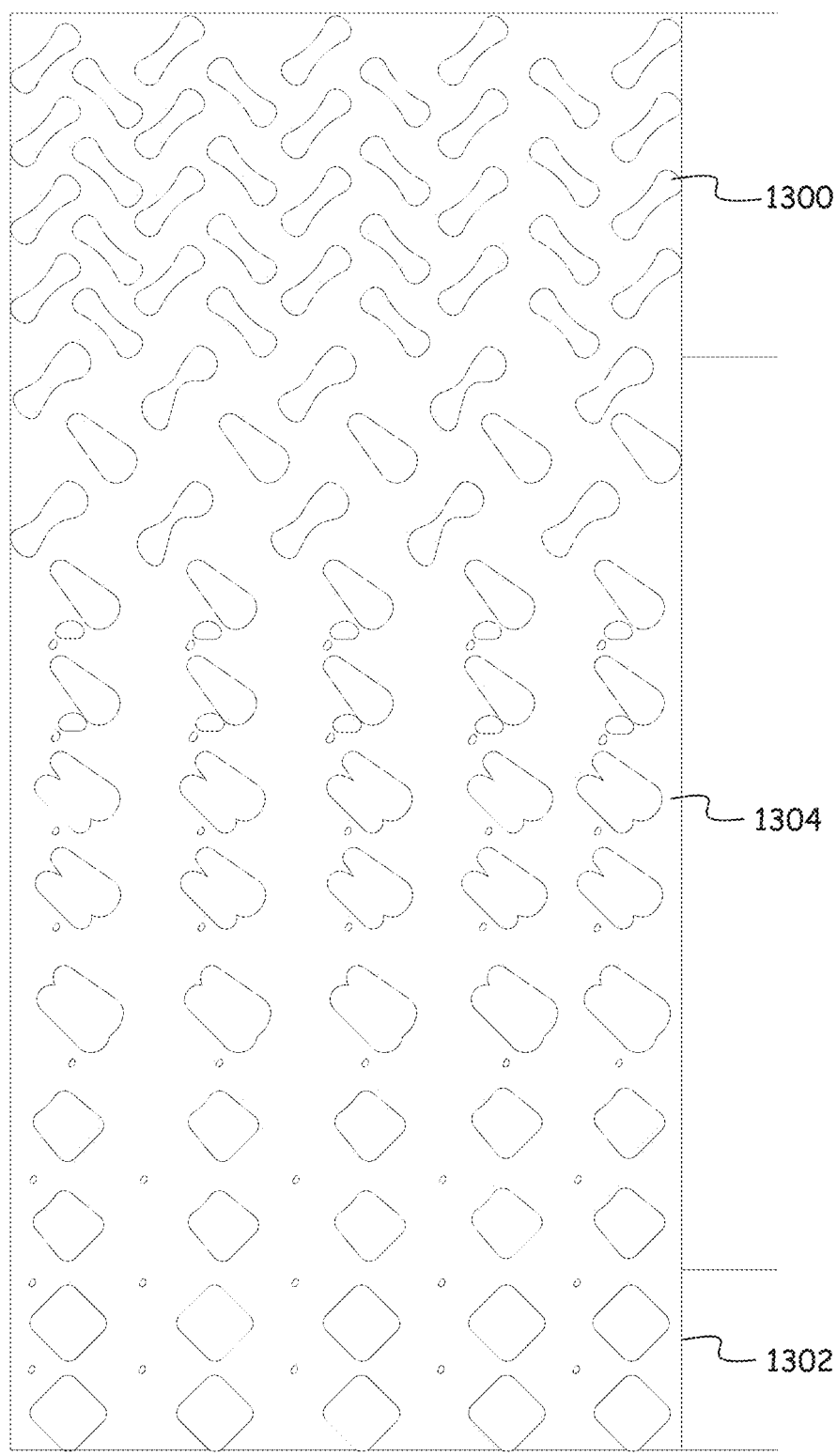

FIG. 23 shows a merged area where two different modulating functions are merged together.

Figure 24:
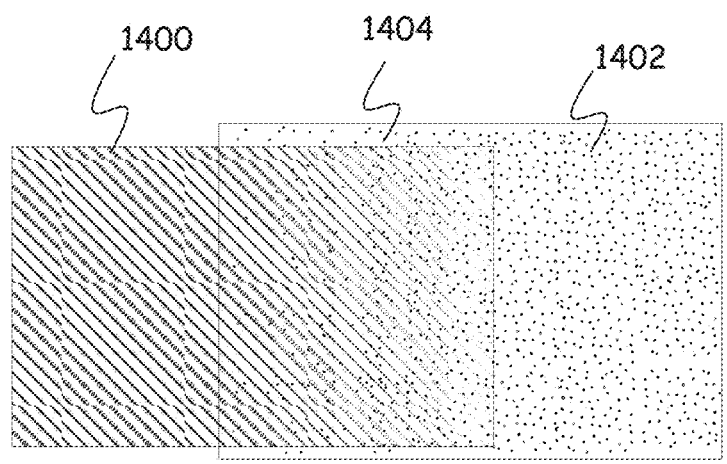

FIG. 24 shows a merged area where two different materials are merged together.

Figure 25A:
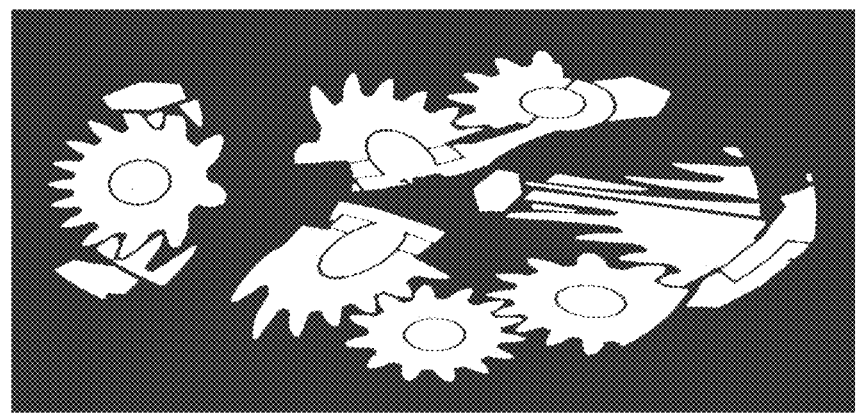
Figure 25B:
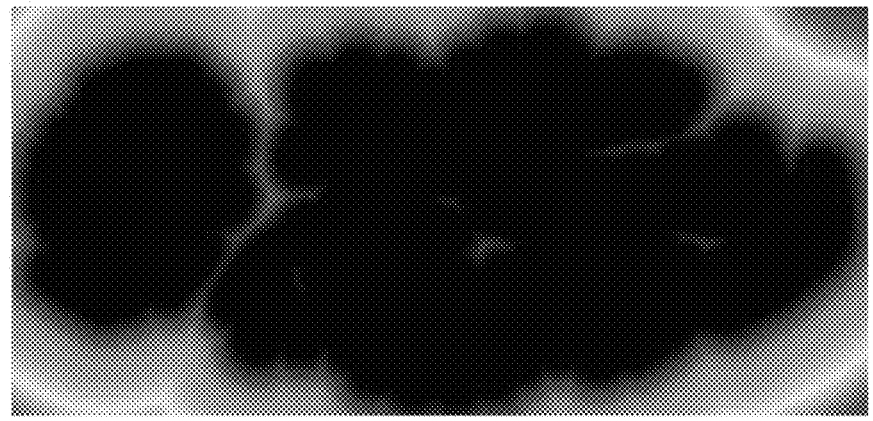

FIGS. 25A and 25B show an input image (FIG. 25A), and a corresponding distance map (FIG. 25B) generated by two independent linear scans used in experiments performed according to embodiments of the present invention.

Figure 26A:
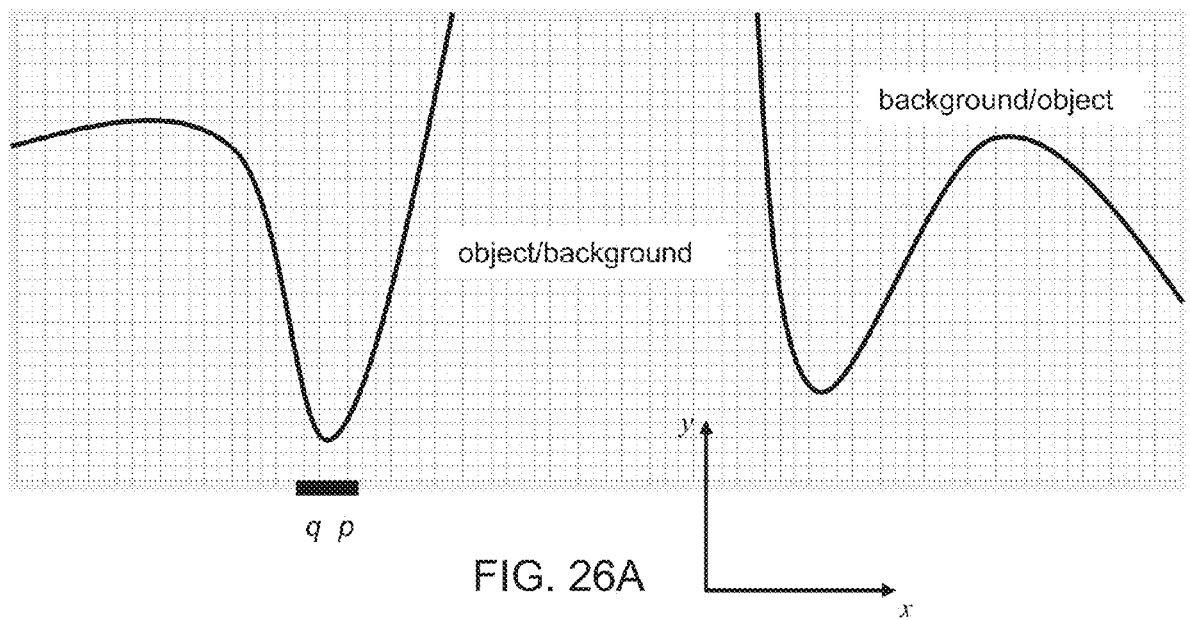
Figure 26B:
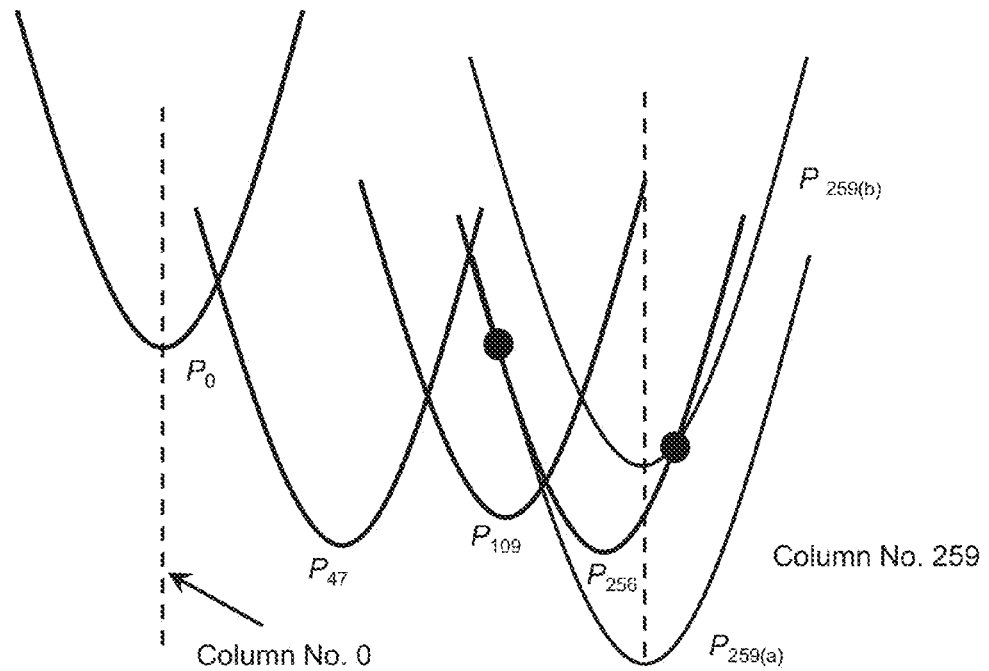

FIGS. 26A-B are schematic illustrations explaining a minimization of an objective function used in experiments performed according to some embodiments of the present invention;

FIGS. 27A-E show results obtained during experiments performed according to some embodiments of the present invention in which a method for generating a distance map was applied to a three-dimensional image having 4 squares at ground level and a horizontal bar at a distance of 10 voxels above the ground level.

Figure 28:
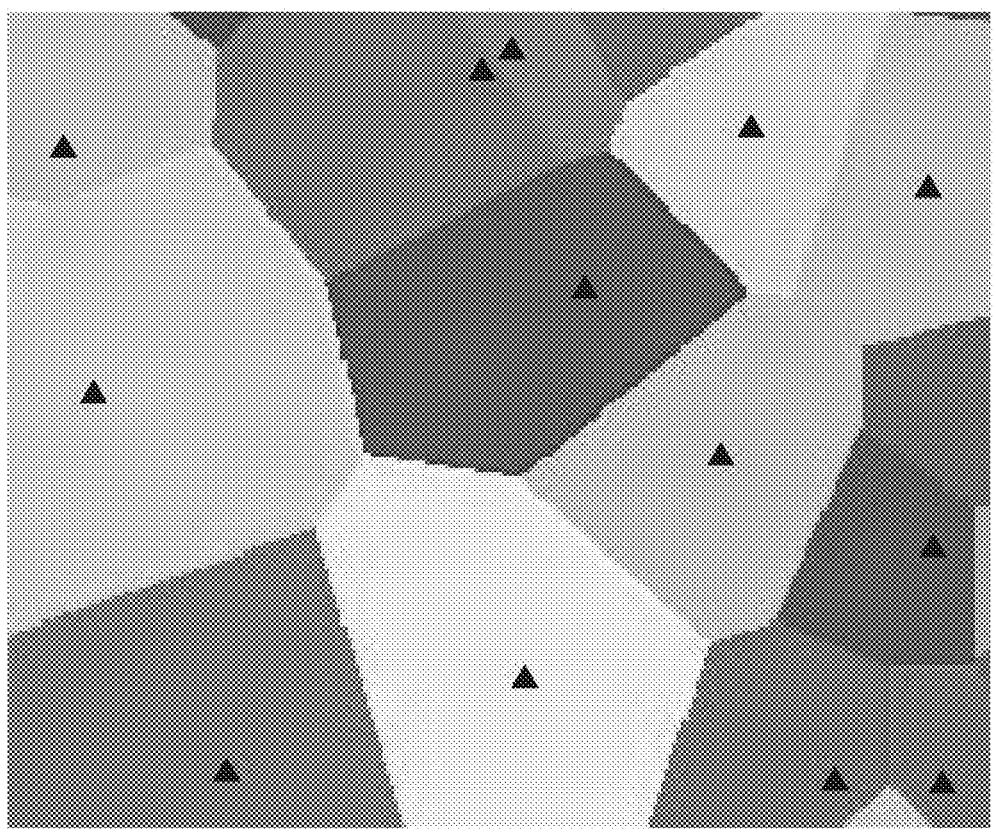

FIG. 28 is a graphical illustration of a closest point map generated in experiments performed according to some embodiments of the present invention.

DESCRIPTION OF SPECIFIC EMBODIMENTS OF THE INVENTION

The present invention, in some embodiments thereof, relates to data rendering and, more particularly, but not exclusively, to a method and system for addressable dispensing of, for example, ink or building material.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data is typically arranged in datasets known as "slices" wherein each slice includes computer object data which is readable by the controller of the AM system and which include fabrication instructions for forming one layer of the object.

The term "object" as used herein refers to a whole object or a part thereof.

The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

Herein throughout, the phrase "uncured building material" collectively describes the materials that are dispensed during the fabrication process so as to sequentially form the layers, as described herein. This phrase encompasses uncured materials (also referred to herein as building material formulation(s) dispensed so as to form the printed object, namely, one or more uncured modeling material formulation(s), and uncured materials dispensed so as to form the support, namely uncured support material formulations.

Herein, the dispensed materials are also referred to collectively as "material formulations". The material formulations provide, typically when hardened (unless indicated otherwise), typically hardened upon exposure to a curing condition as defined herein (unless indicated otherwise), to form a respective material.

Herein throughout, the phrases "cured modeling material" and "hardened modeling material", which are used interchangeably, describe the part of the building material that forms a model object, as defined herein, upon exposing the dispensed building material to curing, and following removal of the support material. The cured or hardened modeling material can be a single hardened material or a mixture of two or more hardened materials, depending on the modeling material formulations used in the method, as described herein.

Herein throughout, the phrase "modeling material formulation", which is also referred to herein interchangeably as "modeling formulation", describes a part of the uncured building material which is dispensed so as to form the model object, as described herein. The modeling formulation is an uncured modeling formulation, which, upon exposure to a curing condition, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid materials or hardened, typically gel materials, are also referred to herein as sacrificial materials, which are removable after layers are dispensed and exposed to a curing energy, to thereby expose the shape of the final object.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, G"/G') value lower than 1. Gels can be characterized as flowable when subjected to a positive pressure of at least 0.5 bar, preferably at least 1 bar, or higher, or, alternatively, as non-flowable when subject to a pressure lower than 1 bar or lower than 0.5 bar or of 0.3 bar or lower.

Currently practiced support materials typically comprise a mixture of curable and non-curable materials, and are also referred to herein as gel support material.

Currently practiced support materials are typically water miscible, or water-dispersible or water-soluble.

Herein throughout, the term "water-miscible" describes a material which is at least partially dissolvable or dispersible in water, that is, at least 50% of the molecules move into the water upon mixture. This term encompasses the terms "water-soluble" and "water dispersible".

Herein throughout, the term "water-soluble" describes a material that when mixed with water in equal volumes or weights, a homogeneous solution is formed.

Herein throughout, the term "water-dispersible" describes a material that forms a homogeneous dispersion when mixed with water in equal volumes or weights.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time".

The final three-dimensional object is made of the modeling materials or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head of the AM. The material formulations are optionally and preferably deposited in layers during the same pass of the printing heads. The material formulations and combination of material formulations within the layer are selected according to the desired properties of the object.

Figure 1A:
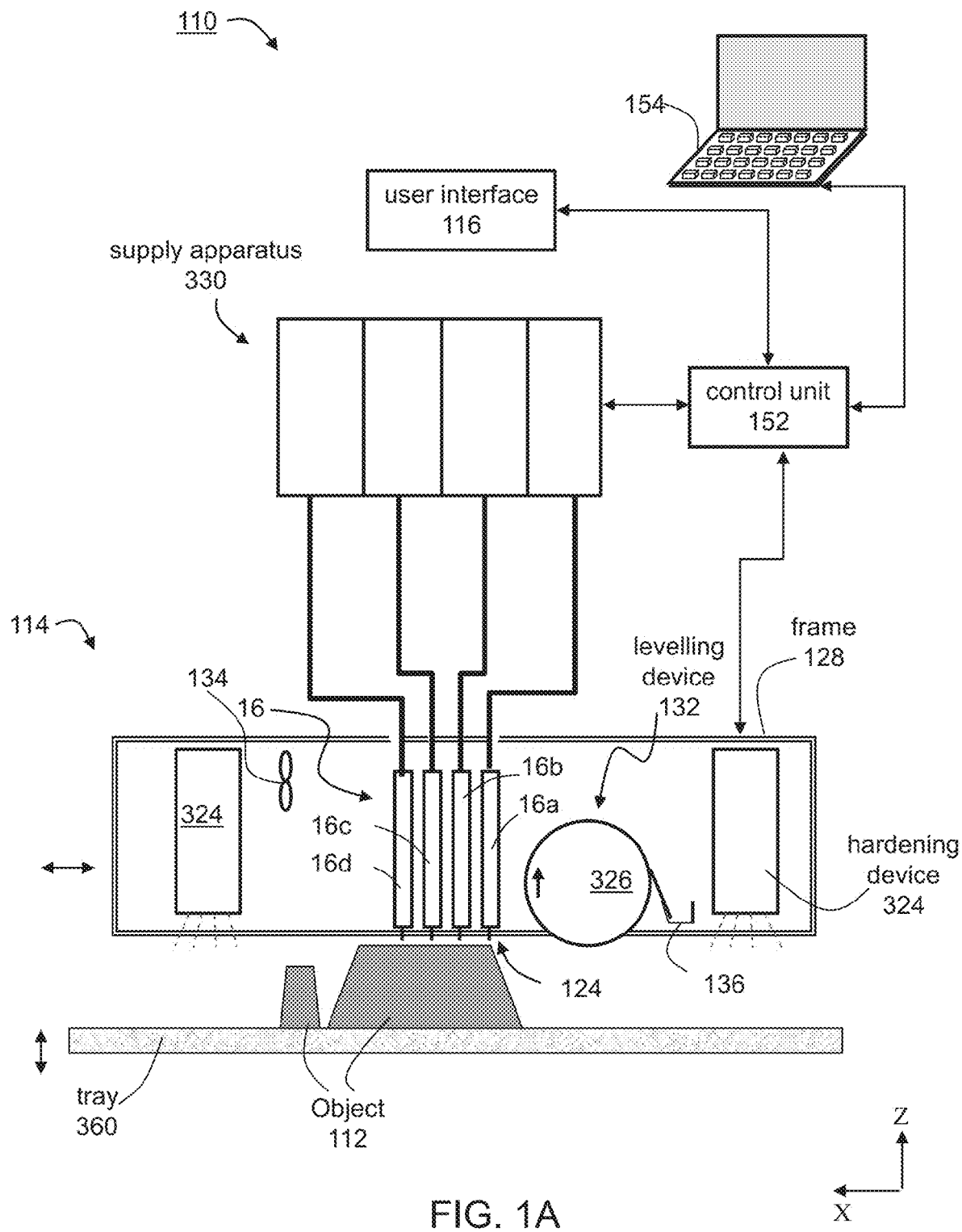

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to hardened. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material formulation in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
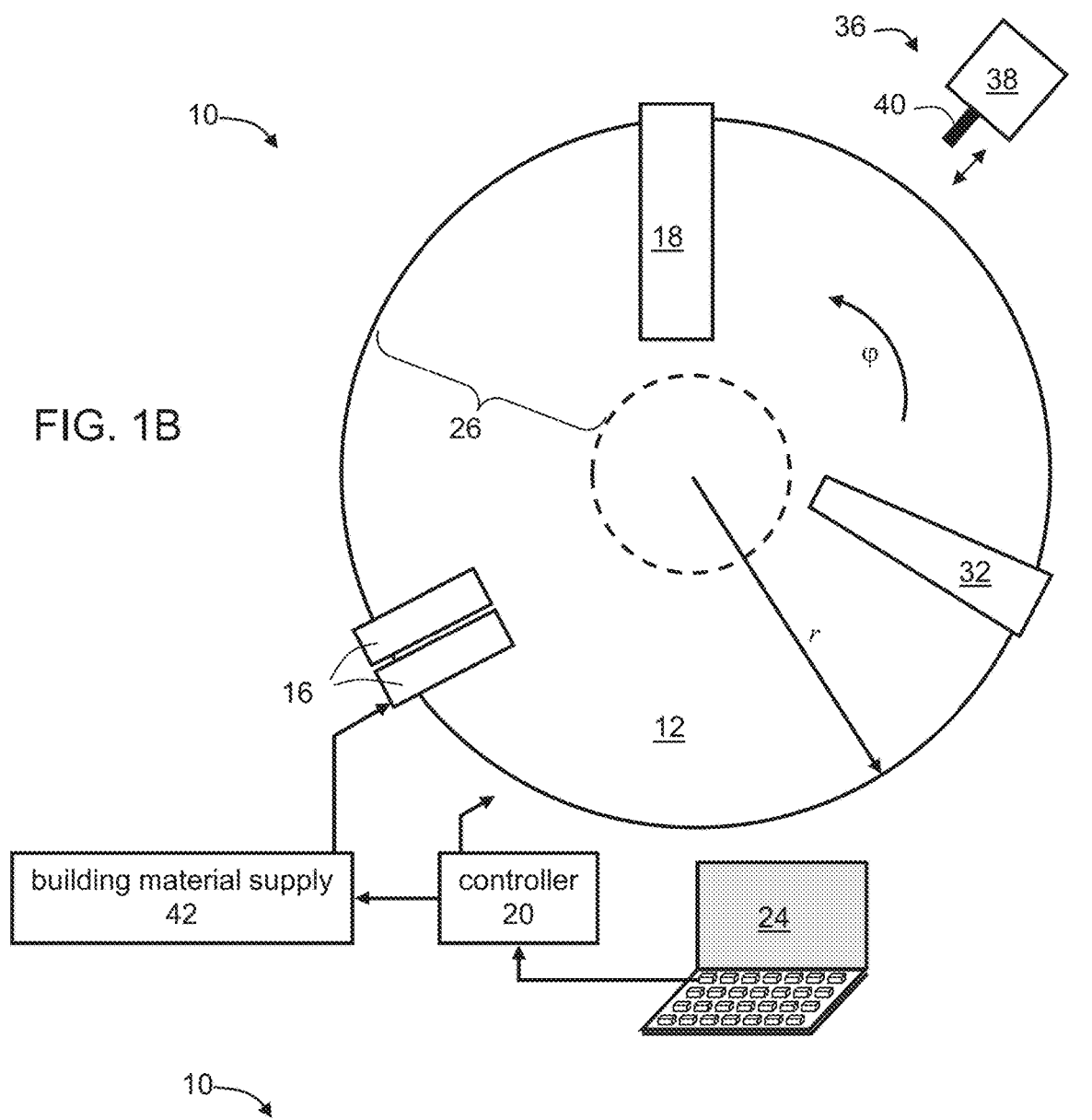
Figure 1C:
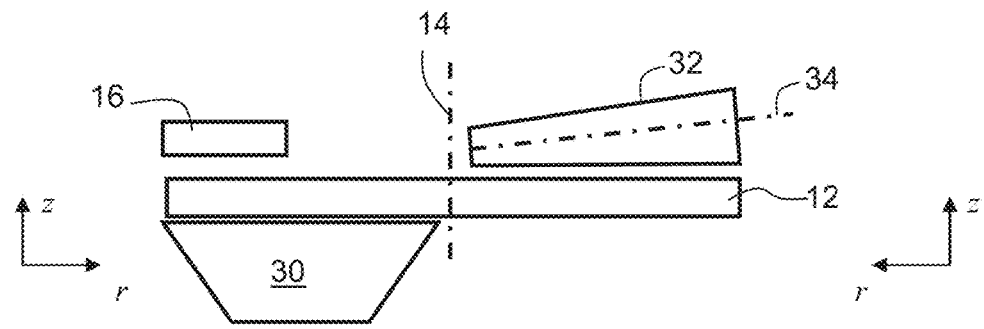
Figure 1D:
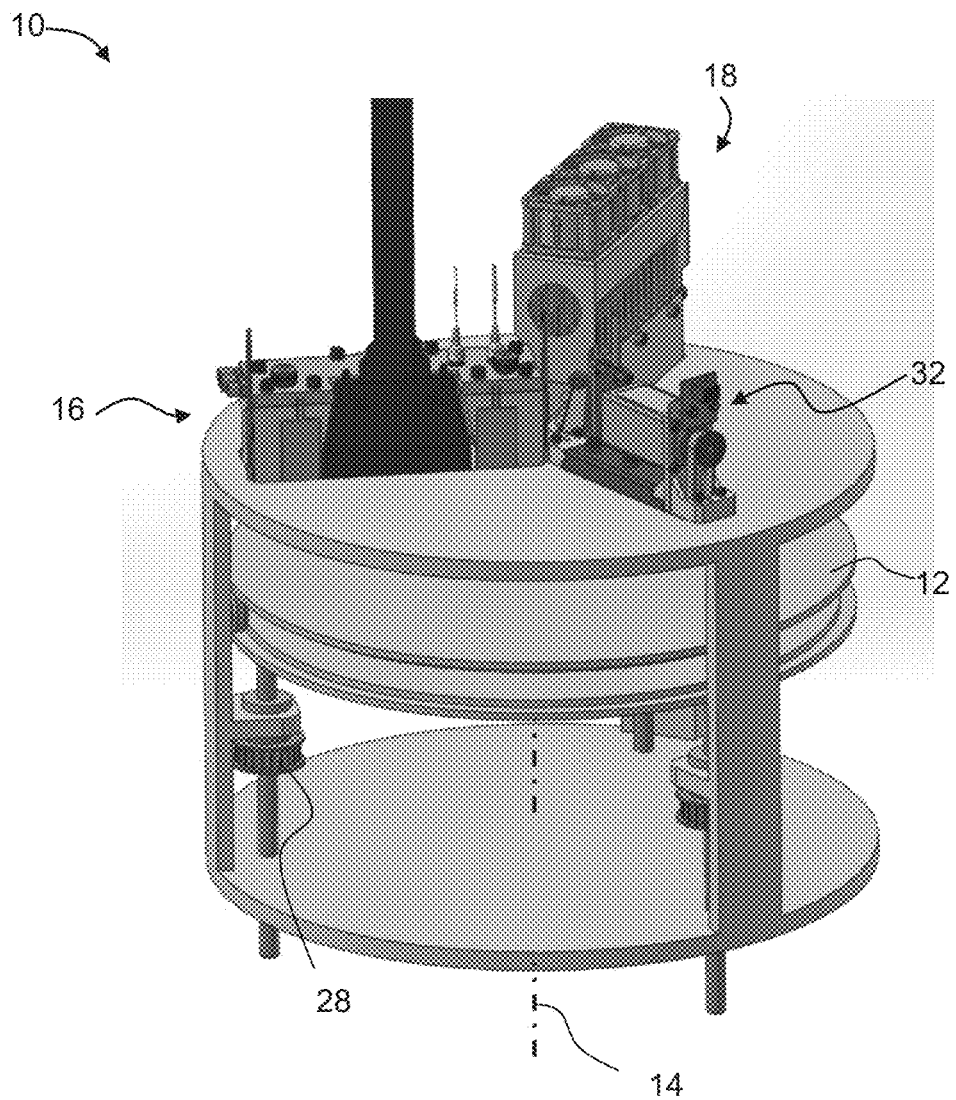

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing a slice of an object (each slice corresponds to fabrication instructions of a different layer of the objects), where FIG. 3A illustrates the slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

FIG. 4 is a flowchart diagram of a method suitable for rendering data according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method is particularly useful for rendering data for addressable dispensing of materials. For example, the method can be used for rendering data for dispensing ink in two-dimensional printing, or for dispensing one or more building materials in AM.

Computer programs implementing the method can commonly be distributed to users on a distribution medium such as, but not limited to, a flash memory, CD-ROM, or a remote medium communicating with a local computer over the internet. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method. All these operations are well-known to those skilled in the art of computer systems.

The method can be embodied in many forms. For example, it can be embodied in on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium.

The method begins at 200 and optionally and preferably continues to 201 at which input image data arranged gridwise over a plurality of picture-elements is received.

References to an "image" herein are, inter alia, references to values at picture-elements treated collectively as an array, which can be a two-dimensional or a three-dimensional array. Thus, the term "image" as used herein also encompasses a mathematical object which does not necessarily correspond to a physical object. The input images certainly do correspond to physical objects, which can be an object which is desired to be displayed, printed or built by AM (e.g., 3D inkjet printing), or an object from which the image data are acquired.

Each picture-element in the image can be associated with a single digital intensity value, in which case the image is a grayscale image. Alternatively, each picture-element can be associated with three or more digital intensity values corresponding to three or more different color channels (e.g., red, green and blue) in which case the image is a color image.

The method can proceed to 202 at which an initial map describing a distance field is generated. The map typically includes a plurality of map-elements, where each map-element stores distance information corresponding to one of the input picture-elements. A distance field generated for an initial map is typically, but not necessarily, includes distances defined perpendicularly to the working surface (e.g., tray 360 or tray 12). Such a distance field is referred to herein as a vertical distance field.

When the grid is a three-dimensional grid describing coordinates of picture-elements of a three-dimensional image containing an object to be built by an AM process (e.g., 3D inkjet printing), the initial map is preferably generated by setting, for each map-element, a value corresponding to a height of the respective picture-element in the image. The height is typically along the build direction of the AM process (the vertical direction z in FIGS. 1A and 1C). The Inventors found that such definition of the initial map allows treating each slice independently of all other slices. This is advantageous since it reduces the memory resources that are needed for rendering the data, and therefore allows AM with higher resolution. In various exemplary embodiments of the invention the value of each map-element is the square of the height of the respective picture-element, but need not necessarily be the case, since, for some applications, it may be desired to employ other values (e.g., the height itself) that depend on the height.

When the input image data include grey level values, the initial map can be generated by setting, for each map-element, a value corresponding to the grey level of the respective picture-element in the image.

The initial map can be generated in more than one way. In some embodiments of the present invention the initial map is a two-value map. In these embodiments the map can be generated by setting, for each of at least a portion of the map-elements (e.g., all the map-elements), one of two predetermined values, wherein a first value is set when the picture-element that corresponds to this map-element is at the boundary of the object in the image, and a second value of is set otherwise. As a representative example, which is not intended to be limiting, zero/infinity initial map can be constructed wherein all the map-elements that correspond to picture-element at the boundary of the object store zeros and all other map-elements store the "infinity" value. It is appreciated that while infinity is not a number it can still represent a stored value, since many computer programs recognize an infinity as one of the acceptable values that can be stored in a variable.

Embodiments in which the initial map is a two-value map are particularly useful when the grid is a two-dimensional grid describing coordinates of picture-elements of a two-dimensional image.

In some embodiments of the present invention, the initial map is a multi-value map, wherein the number of different values that are stored in the various map-elements is more than two.

The distance information is typically according to a Euclidian metric, but other metrics, such as, but not limited to, a taxicab metric are also contemplated in some embodiments of the present invention.

The method continues to 203 at which the map is linearly scanned along a first axis and to 204 which the map is linearly scanned along a second axis.

Each of linear scans 203 and 204 can be bi-directional along the respective axis. Specifically, denoting the axis along which the ith scan is performed by $\xi_i$ (i=1, 2), the scan along this axis, the scan can be along the $+\xi_i$ direction, the $-\xi_i$ direction or both the $+\xi_i$ direction and the $-\xi_j$ direction.

The first and second axes are preferably orthogonal to each other. For example, the first and second axes can be defined along rows and columns of the map, corresponding to rows and columns of picture-element in the image. When the grid is a three-dimensional grid, the first and second axes are preferably orthogonal to the vertical axis. For example, the first and second axes can be the scanning and the indexing axes of the AM system (e.g., 3D inkjet printing system).

Each of the linear scans 203 and 204 is preferably executed for each picture-element p of at least a portion of the picture-elements, e.g., for each picture-element of the image. During the linear scan, the respective map-element is updated based on values of map-elements that are visited during the scan. Typically, the update is executed in accordance with a predetermined objective function F, wherein map-elements for which the predetermined objective function reaches an extremum (minimum or maximum) are updated by the value of the objective function. For example, map-elements along the scan for which the objective function is minimized can be updated by the value of the objective function.

The objective function F optionally and preferably correlates with the distance $d_{pq}$ between picture-element p (for which the linear scan is performed) and the picture-element q that corresponds to the map-element that is currently visited during the scan. For example, the objective function can comprise the square of $d_{pq}$ or the absolute value of $d_{pq}$. The metric according to which $d_{pq}$ is calculated depends on the metric according to which the distance information is stored in the map. Thus, when a Euclidian metric is employed, $d_{pq}$ typically correlates with the Euclidian distance between picture-elements p and q, and when a taxicab metric is employed, $d_{pq}$ typically correlates with the taxicab distance (also known in the literature as the Manhattan distance) between picture-elements p and q.

As a representative example for an objective function F suitable for preferred embodiments of the present invention in which a Euclidian metric is employed, is:

$$F(p,q)=DM(q)+(p-q)^2 \quad \text{(EQ. 1)}$$

where DM(q) is the value stored in of the map-element that corresponds to picture-element q, and where $(p-q)^2$ is the Euclidian distance between picture-elements p and q.

The scans along the two axes are linear in the sense that for a given axis $\underline{u}$ and a given picture-element p only map-elements that correspond to picture-elements that are on axis u with respect to picture-element p are visited. This is illustrated schematically in FIG. 5, for the case in which the first and second axes are along orthogonal x and y coordinates defining rows and columns of the grid. Shown is a map 210 with a plurality of map-elements 212. The map-element that corresponds to picture-element p (for which the linear scans are performed) is illustrated as a filled square. The map-elements that are visited during the scan along the x axis are illustrated as empty squares, the map-elements that are visited during the scan along the y axis are illustrated as cross-filled squares, and all other the map-elements are illustrated as dashed empty squares. Thus, not all the map-elements of the map are visited for picture-element p, so that the computation resources are significantly reduced.

For each of the two axes, the method scans the map-elements along the respective axis (x and y in the illustration shown in FIG. 5) and searches for the map-element for which the value of F (e.g., the function defined in EQ. 1) reaches an extremum value (e.g., a minimum). Once such a map-element is found, its stored value is replaced with an updated value, which in some embodiments of the present invention is the value of F itself. Two such map-elements (one for each of axes x and y) are marked by ovals in FIG. 5.

The scans are optionally and preferably interdependent from each other, and can therefore be executed in any order of execution. For example, the method can select a map-element corresponding to one picture-element and perform two scans along two respective axes (e.g., x and y in the illustration shown in FIG. 5) intersecting at the selected map-element, then select another picture-element and perform two scans along two respective axes intersecting at the other map-element, and so on. Alternatively, the method can firstly select one of the two axes and perform scans along the selected axis for two or more map-elements (e.g., all the map-elements), and then perform scans along the other axis for these two or more map-elements. Combinations of these alternatives are also contemplated.

The method can optionally and preferably continue to 205 at which a global transformation is applied to the map, so as to form a distance map that represents the distance field over the grid. For example, when the map-elements are updated by values that are proportional to the squares of the distances (e.g., by means of the objective function defined in EQ. 1), operation 205 can include replacing the stored values of each map-element by its square root.

The method can optionally and preferably continue to 206 at which the distance map is processed to distinguish between picture-elements that belong to the object and picture-elements outside the object. For example, for picture-elements that are outside of the object the respective map-elements can be assigned with a negative value, for picture-elements that are inside of the object the respective map-elements can be assigned with a positive value, and for picture-elements that are at the boundary of the object the respective map-elements can be assigned with a zero value.

When the grid is a three-dimensional grid, operations 202-204 and optionally also at least one of operations 205 and 206 are optionally and preferably repeated separately for separate slices. Thus, in various exemplary embodiments of the invention, once the operations are completed for one slice, a sub-map corresponding to this slice is formed, and the method loops back, e.g., from 204, 205 or 206, to 202 for generating an initial sub-map and performing the scans to form the sub-map for the next slice.

The method ends at 207.

The present inventors found that it is advantageous to generate the initial map using one processor and to perform the scan using another processor. For example, the generation of the initial map (e.g., a vertical distance field), which typically requires less resources, can be executed by a graphics processing unit (GPU), wherein the linear scans and optionally other operations can be performed by a central processing unit (CPU). Typically, the GPU and CPU are of the same computer system (e.g., computer system 24 or 154). Preferred embodiments of the present invention can thus load a computerized model of an object (e.g., a CAD model) onto the GPU, use the GPU to generate 202 the initial map, load the initial map onto the CPU, and use the CPU for performing the scans 203 and 204 and optionally also the global transformation 205 and/or processing 206.

When the grid is a three-dimensional grid, and method 200 produces a distance sub-map separately for each slice, the CPU can transmit each distance sub-map separately to a controller of the dispensing system (e.g., a two-dimensional printing system or an AM system), and then purge the sub-map from its associated memory. This allows the computer system to save in its associated memory only data pertaining to the distance sub-map that is currently produced. Conventional techniques need to save data pertaining to all the slices in their memory. Since the amount of space in their memory is typically insufficient, conventional techniques are required to apply down sampling or multiresolution techniques, hence to compromise on the resolution. The technique of the present embodiments is therefore advantageous over conventional techniques, since there is no need to save all the sub-maps in the memory, and therefore there is no need to apply down sampling or multiresolution techniques.

FIG. 6 is a flowchart diagram describing a method suitable for generating dispensing instructions for use by a dispensing system, according to some embodiments of the present invention. The method can be used, for example, by a two-dimensional printing system for printing a two-dimensional image containing an object, or by an AM system, e.g., a three-dimensional inkjet printing system, for fabricating a three-dimensional object. In various exemplary embodiments of the invention the method is used by system 10 or system 110.

The method begins at 230 and continues to 231 at which a distance map or sub-map is obtained for a slice of the object. The distance map or sub-map can be generated by the method 200 described above with reference to FIGS. 4 and 5. The method proceeds to 232 at which a material to be dispensed is designated for each picture-element (e.g., voxel) of at least a portion of the picture-elements (e.g., all the picture-elements). The material designation for a particular picture-element is typically based, at least in part, on the respective map-element.

In some embodiments of the invention operation 232 is executed to select different materials for picture-elements at interlaced locations such as to form a textured region. The interlaced locations are optionally and preferably selected according to a modulating function. The modulation function receives a position of a candidate picture-element (e.g., voxel) and provides an output value, which is then used to select the material for the candidate picture-element. Thus, one material is designated for the picture-element when the output value is within one predetermined range of output values, another material is designated for the candidate picture-element when the output value is within another predetermined range of output values, and so on. Typically, there is at least one output value or range of output values for which no material is designated for the candidate picture-element.

In some embodiments of the present invention, map-elements are employed in combination with the modulating function. Typically, a picture-element (e.g., a voxel) is selected and a value stored in the respective map-element is used as an input for the modulating function. Thus, in these embodiments, the modulating function receives the position and distance field value of the candidate picture-element and provides an output value, which is then used to select the material for the candidate picture-element as further detailed hereinabove.

The present embodiments contemplate many types of modulating functions. For example, in some embodiments of the present invention the modulating function comprises a noise function. Representative examples of noise functions suitable for being included in the modulating function include, without limitation, a simplex noise function, an open simplex noise function, a Worley noise function, a Perlin noise function, a wavelet noise function, and a value noise function. In some embodiments, the modulating function comprises a periodic function. Typically, but not necessarily, the periodic modulating function has a period of 2 or less mm. In some embodiments, the modulating function comprises an aperiodic function. Combination of two or more of these or other functions is also contemplated. A more detailed description of the concept of modulating functions and distance fields is provided in the Examples section that follows.

The material designation can additionally be based on a set of dispensing rules associated with the object (e.g., a set of AM rules when the object is a 3D object). The set of dispensing rules optionally and preferably include building material formulation(s) to be dispensed as well as dispensing parameters and conditions (e.g., temperature, interlacing ratios, interlacing texture). The set of dispensing rules can be obtained from a look-up table having an entry for each type of object, and a set of parameters associated with each such entry.

The method continues to 233 at which dispensing instructions are generated based on the designation 232. The dispensing instructions are readable by the controller of the dispensing system (e.g., controller 20 of system 10 or controller 340 of system 110) and can include a material bitmap having a plurality of bitmap-elements, each storing information pertaining to a material to be dispensed. The dispensing instructions can optionally and preferably include, in addition to the material bitmap, toolpath instructions that describe the paths along which the dispensing head(s) should be moved to dispense material. For example, a marching square algorithm can be applied to identify toolpaths from the bitmap. In some embodiments, the material bitmap is converted into meshes that provide three-dimensional descriptions of the object's boundaries. Such meshes can be applied as input to other dispensing systems or as input to CAD systems. In some embodiments, a marching cubes algorithm is used to identify the meshes from the bitmap.

The method continues to 234 at which the dispensing instructions are transmitted to the controller of the dispensing system. The controller receives the dispensing instructions and instructs the dispensing head(s) of the dispensing system (e.g., head(s) 16 of system 10 or system 110) to dispense 236 the material formulations to form the object responsively to the instructions.

When the grid is a three-dimensional grid, the dispensing instructions are optionally and preferably generated and transmitted on a slice-by-slice basis, so that the dispensing instructions include instructions for building one layer and optionally, but not necessarily, two more layers, but not all the layer. For example, a sub-map corresponding to a particular slice can be obtained at 231 and operations 232-235 can be executed for the particular slice but not for any other slice, namely based on the information in the obtained sub-map but not based on information in any other sub-map. Thus, in some exemplary and preferred embodiments of the invention, once the dispensing instructions for the particular slice are transmitted to the controller, the method loops back, e.g., from 234 or 235 to 231 for obtaining a distance sub-map corresponding to the next slice.

The method ends at 236.

FIG. 7 is a flowchart diagram that describes a preferred procedure suitable for generating a material bitmap, which can be included according to some embodiments of the present invention in the dispensing instructions. The procedure can thus be executed during the execution of operation 233 above. The procedure begins at 720 and is optionally and preferably applied for each of the picture-elements (e.g., each of the voxels).

At decision 721 a distance field value relative to the object is retrieved from the respective map-element. When the picture-element (e.g., voxel) is within or on the outermost surface of the object (for example, when the distance field value is positive), the procedure continues to 722 at which a building material formulation is allocated for the respective picture-element. The building material formulation can be a modeling material formulation, a support material formulation, or a liquid material formulation, and is optionally and preferably determined based on the position of the picture-element in the object (e.g., the position of the voxel in case the object is a 3D object) and the dispensing rules (e.g., AM rules for a 3D object). From 722 the procedure continues to 724 at which the procedure selects a pixel value that corresponds to the allocated building material formulation. The pixel value can be any value that uniquely represents the allocated building material formulation. For example, the pixel value can be a grayscale level or a color value (e.g., RGB value).

When the picture-element (e.g., voxel) is outside the object (for example, when the distance field value is negative), the procedure continues to decision 723 at which the procedure determines whether the picture-element is to be occupied or left vacant. If the picture-element is to be left vacant, the procedure continues to 726 at which the procedure selects a pixel value that uniquely represents a vacant pixel. For example, the procedure can select a null value to represent a vacant pixel. Alternatively, when the picture-element is outside the object the procedure can continue from 723 to terminal 728 where it ends, in which case pixels that have not been assigned with any values are to be interpreted as instructions to leave a picture-element vacant.

If the picture-element is to be occupied, the procedure continues to 725 at which a building material is allocated to the picture-element, and then to 724 at which the procedure selects a pixel value that corresponds to the allocated building material formulation as further detailed hereinabove.

From 724, 725 or 726, as the case may be, the procedure continues to 727 at which the selected pixel value is assigned to a pixel in the material bitmap.

The procedure ends at 728.

FIG. 8 is a flowchart diagram that describes a method 750 suitable for generating a closest point map or sub-map according to some embodiments of the present invention. The method 750 can be executed in combination with any of methods 200 and 230 above. For example, the method can be executed in parallel with or subsequently to method 200 so as to provide both a distance map or sub-map and a closest point map or sub-map. A closest point map or sub-map is particularly useful for determining whether a particular picture-element is inside the object, outside the object or on the boundary of the object. Thus, the method 750 can be executed during the execution of operation 206 above.

The method begins at 750 and continues to 751 at which input image data arranged grid-wise over a plurality of picture-elements, is received. The method can proceed to 752 at which an initial closest point map is generated. The initial closest point map typically has a plurality of map-elements each corresponding to one picture-element and storing a location of a point on an object in the image data to which the picture-element is closest.

The initial closest point map can be generated in more than one way. In some embodiments of the present invention the initial closest point map is a two-value map. In these embodiments the closest point map can be generated by setting, for each of at least a portion of the map-elements (e.g., all the map-elements), one of two predetermined values, wherein a first value is set when the picture-element that corresponds to this map-element is at the boundary of the object in the image, and a second value of is set otherwise. As a representative example, which is not intended to be limiting, zero/infinity initial closest point map can be constructed, in a similar way as described above with respect to the distance map. Embodiments in which the initial map is a two-value map are particularly useful when the grid is a two-dimensional grid describing coordinates of picture-elements of a two-dimensional image.

In some embodiments of the present invention, the initial map is a multi-value map, wherein the number of different values that are stored in the various map-elements is more than two.

When the grid is a three-dimensional grid describing coordinates of picture-elements of a three-dimensional image containing an object to be built by an AM process (e.g., 3D inkjet printing), the initial closest point map is preferably generated by setting, for each map-element, a value corresponding to a height of the respective picture-element in the image, in a similar way as described above with respect to the distance map for the case of three-dimensional grid.

The method continues to 753 at which the closest point map is linearly scanned along a first axis and to 754 which the closest point map is linearly scanned along a second axis, in a similar way as described above with respect to the distance map. Each of the linear scans 753 and 754 is preferably executed for each picture-element p of at least a portion of the picture-elements, e.g., for each picture-element of the image. During the linear scan, the respective map-element is updated based on values of map-elements that are visited during the scan. Typically, the update is executed in accordance with a predetermined objective function G, wherein map-elements for which the predetermined objective function G reaches an extremum (minimum or maximum) are updated by the value of the objective function. For example, map-elements along the scan for which the objective function is minimized can be updated by the value of the objective function.

Similarly, to the method for generating the distance map, the scans are optionally and preferably interdependent from each other, and can therefore be executed in any order of execution.

When the grid is a three-dimensional grid, operations 752-744 are optionally and preferably repeated separately for separate slices. Thus, in various exemplary embodiments of the invention, once the operations are completed for one slice, a sub-map of closest points corresponding to this slice is formed, and the method loops back, e.g., from 74, to 752 for generating an initial closest point sub-map and performing the scans to form the sub-map for the next slice.

The method ends at 757.

It is expected that during the life of a patent maturing from this application many relevant printing and AM systems will be developed and the scope of the term "dispensing system" is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Distance Field and Modulation Functions

The present example describes a method that includes selecting a voxel from a three-dimensional build space and for the selected voxel, determining a distance field value relative to a three-dimensional part in the three-dimensional build space. The method can be used for preparing computer object data for use in systems 110 and 10 according to some embodiments of the present invention. At least some of the description below is also described in international patent application No. PCT/US2017/019340, filed on Feb. 24, 2017, the contents of which are hereby incorporated by reference.

The distance field value can be used to select at least one material selection rule and a feature of the voxel is applied to the at least one material selection rule to identify a material designation for the voxel. The material designation indicates no material is to be placed at the voxel when the material selection rule identifies no material for the voxel and the material designation indicates at least one material is to be placed at the voxel when the at least one material selection rule identifies the at least one material for the voxel. The material designation for the voxel is then output for use in building the three-dimensional part using an additive manufacturing system.

In some embodiments of the present invention the method includes selecting a voxel in a three-dimensional build space, determining a first distance field value for the voxel relative to a boundary of a first three-dimensional part positioned in the three-dimensional build space, and determining a second distance field value for the voxel relative to a boundary of a second three-dimensional part positioned in the three-dimensional build space. The first distance field value and the second distance field value are then used to set a material designation for the voxel.

To build a part using additive manufacturing, instructions must be provided to the printer to indicate what material, if any, should be placed in each of the available locations of each printing layer. In the past, these instructions were produced by identifying the exterior bounds of each part at each slice using boundary representations. A part material was then designated for each location that was positioned along the boundary of the part. If the part was to be solid, the material set for the part was also designated for each location within the boundaries of the part. In such systems, all material transitions, either from one material to another material, or from a material to open space, had to be described by a boundary representation.

The present inventors have discovered that relying on such boundary representations to control transitions between materials creates several problems. First, performing rounding, lofting and offset modeling operations where boundary representations are shifted inward or outward to produce the print instructions can produce errors or unexpected results due to interference between shifted boundary representations. This typically occurs when the topology of the part is complex. Second, Boolean operations, such as subtraction or union, which are performed between two different parts when generating print instructions, can fail if the boundary representations of the parts do not define an enclosed object. Any opening in the part will cause the Boolean operations to be limited to the boundary representation itself instead of the complete volume of the part. Third, it is extremely difficult to define lattices using boundary representations because the lattices require a huge number of meshes resulting in a large amount of data. Fourth, it is not possible to form material gradients in which a mixture of materials changes over some dimension of the part.

In the embodiments described below, the problems associated with boundary representations are overcome by using distance fields. In one embodiment, a distance field is created by dividing the three-dimensional build space, which contains the part(s) to be manufactured, into a three-dimensional matrix of voxels. The closest distance from each voxel to a part boundary is then determined such that if the voxel is within the part, the distance is set as a positive value, if the voxel is outside of the part, the distance is set as a negative value and if the voxel is on the part boundary, the distance is zero. This produces a three-dimensional matrix of distance field values. Each part has its own associated distance field. As a result, when there are multiple parts in the build space, each voxel has multiple different distance field values, each associated with a separated part.

Once the distance fields are determined, they are used to select at least one material selection rule for each voxel. Each material selection rule identifies a material designation for the voxel using at least one feature of the voxel such as the distance field value of the voxel and the position of the voxel in the build space, for example. In some embodiments, the material selection rule includes a periodic function that is a function of the distance field values and/or the position in the build space such that one range of output values produced by the periodic function is associated with no material being designated for the voxel and another range of output values produced by the periodic function is associated with a material being designated for the voxel. Such periodic functions allow lattices to be defined in the build space.

FIG. 9A shows an example of a simplified system for assigning materials to voxels and manufacturing parts using the assigned materials. In FIG. 9A, a computer 9066 acts as a host computer for an additive manufacturing system 9068 and communicates with system 9068 over one or more communication lines 9070. In some embodiments, computer 9066 is internal to system 9068, such as part of an internal controller assembly for system 9068. In other embodiments, computer 9066 is external to additive manufacturing system 9068.

FIG. 10 shows a block diagram of an example architecture for computer 9066. As shown, computer 9066 includes suitable computer-based hardware, such as a user interface 9082, a memory controller 9084, a processor 9086, a graphics processing unit 9087, a storage media 9088, an input/output (I/O) controller 9090, and a communication adapter 9092. Computer 9066 may also include a variety of additional components that are contained in conventional computers, servers, media devices, signal processing devices, and/or printer controllers.

User interface 9082 is one or more user-operated interfaces (e.g., keyboards, touch pads, touch-screen displays, display monitors, and other eye, voice, movement, or hand-operated controls) configured to operate computer 9066. Memory controller 9084 is one or more circuit assemblies that interface the components of computer 9066 with one or more volatile random access memory (RAM) modules of storage media 9088. Processor 9086 is one or more computer-processing units configured to operate computer 9066, optionally with memory controller 9084, and preferably with related processing circuitry (e.g., programmable gate arrays, digital and analog components, and the like). For instance, processor 9086 may include one or more microprocessor-based and/or microcontroller-based units, one or more central processing units, and/or one or more front-end processing units.

Graphics processing unit 9087 contains a large number of transistors that are arranged to perform calculations related to 3D computer graphics in a fast an efficient manner. Such calculations include texture mapping and rendering polygons that represent 3D objects.

Storage media 9088 is one or more internal and/or external data storage devices or computer storage media for computer 9066, such as volatile RAM modules, read-only memory modules, optical media, magnetic media (e.g., hard disc drives), solid-state media (e.g., FLASH memory and solid-state drives), analog media, and the like. Storage media 9088 may retain one or more pre-processing and/or post-processing programs (not shown) discussed further below.

I/O controller 9090 is one or more circuit assemblies that interface memory controller 9084, processor 9086, and storage media 9088 with various input and output components of computer 9066, including user interface 9082 and communication adapter 9092. Communication adapter 9092 is one or more wired and/or wireless transmitter/receiver adapters configured to communicate over communication lines 9070.

The commands from computer 9066 to the components of systems 9068 may be performed with one or more of user interface 9082, memory controller 9084, processor 9086, storage media 9088, input/output (I/O) controller 9090, communication adapter 9092, and/or other suitable hardware and software implementations, as is understood by those skilled in the art.

FIG. 11 provides a flow diagram of a method of generating print instructions from part models using distance fields. FIG. 12 provides a block diagram of a system 9200 used to implement the method of FIG. 11. In accordance with one embodiment, system 9200 is implemented in computer 9066.

In step 9100, part data is received including meshes 9202, texture maps 9204, bump maps 9206, shine maps 9208, point features 9209 and a part resolution, which are stored in storage media 9088. Meshes 9202 describe planar boundaries of the part and can be defined as interconnected triangles or interconnected quadrilaterals. Texture maps 9204 describe the location and geometry of surface textures to be applied on the outside of each of the surfaces described by meshes 9202. Bump maps 9206 provide descriptions of larger surface features present on particular surfaces of the meshes 9202. FIG. 13 provides an example of a portion of a part showing two surfaces 9300 and 9302 having textures marked by the raised squares 9304 and a surface bump 9306 represented by the large raised square. The small squares 9304 would be described in the texture maps 9204 while the surface bump 9306 would be described in the bump maps 9206. Shininess maps 9208 indicate a desired level of shine for different surfaces of the part.

Point features 9209 describe sets of material selection rules to be used for portions of the part having specific features. Examples of part features that can be used as the basis for assigning sets of material selection rules include identifiers of a body or mesh, surface texture coordinates, and surface normal ranges. Thus, in some embodiments, different portions of a part have different sets of material selection rules such that at the same distance field values, different materials will be used for different areas around the part. A further description of the use of such point features is provided below.

Meshes 9202, texture maps 9204 and bump maps 9206 are provided to a slice computations process 9210 executed by graphics processing unit 9087, which performs step 9101-9116, 9120, 9122 and 9124 of FIG. 11 described further below.

At step 9101, slice computations process 9210 defines a three-dimensional build space and orients the parts described by meshes 9202, texture maps 9204 and bump maps 9206 in the three-dimensional build space to form oriented digital models 9091. In accordance with one embodiment, the build space is defined by first orienting the digital parts and then defining a bounding box around the oriented parts to provide a support structure envelope around the parts.

FIG. 14 provides a three-dimensional view of a three-dimensional part model 402 oriented in a three-dimensional build space 400. In FIG. 14, there is a −Z direction 406, a +Z direction 408, an X direction 410 and a Y direction 412. A slice 400 of build space 400 is shown to include a collection of voxels, such as voxel 414. Although only a single slice is shown in FIG. 14, there are multiple slices in build space 400 such that voxels fill the entirety of build space 400. The dimensions of the voxels are based on the resolution set for the part.

At step 9102, slice computations process 9210 sets values for Z buffer 9095 for each slice in build space 400. The Z buffer for a slice contains a value for each voxel in the slice, where the magnitude of the Z buffer value represents the magnitude of the vertical distance between the voxel and the closest STL boundary of the part. The STL boundary of the part is constructed from the combination of one or more meshes 9202, texture maps 9204 applied to those meshes, and bump maps 9206 applied to those meshes. In step 9102, this distance is determined by looking in −Z direction 406 from the voxel and the Z buffer is therefore referred to as the −Z buffer. The sign of the Z buffer value indicates whether the voxel is inside or outside the part with negative values indicating that the voxel is outside of the part and positive values indicating that the voxel is inside the part. Initially, all of the −Z buffer values for a slice are set to a maximum negative value, which indicates that no portion of the part is visible in −Z direction 406 from any of voxels.

A rendering operation is then performed by GPU 9087 using meshes 9202, texture maps 9204 and bump maps 9206 to construct a description of the STL boundaries of the part in three-dimensional build space 400 and to project that description onto the slice. In particular, each surface in meshes 9202 is rendered one at a time and the texture maps 9204 and bump maps 9206 are applied to the rendered surfaces to produce the STL boundaries for the surface and the resulting STL boundaries for the surfaces are projected onto the slice by identifying the voxels that are directly above the STL boundaries in the three-dimensional build space. For each voxel that is directly above the STL boundaries of a surface, the distance between the STL boundary and the voxel is compared to the current distance stored in the −Z buffer for the voxel. If the distance to the surface currently being projected has a smaller magnitude than the value stored in the −Z buffer, the current surface is considered to be closer to the voxel than any previously rendered surfaces of the part and the −Z buffer is updated with the distance to the current STL boundary. The sign of the distance value stored in the −Z buffer is set to indicate whether the voxel is inside or outside the part. This can be determined based on the angle between the outward normal of the current surface and the +Z direction 408. In accordance with one embodiment, the identity of the current surface is also stored in an additional buffer for the slice. If the distance between the current STL boundary and the voxel is larger than the magnitude of the Z buffer value for the voxel, the Z buffer value remains unchanged. This will occur when the current surface is obscured from the voxel by another surface of the part, which is closer to the voxel. Thus, after every surface of the part below the current slice has been rendered and projected onto the slice, the Z buffer contains values indicating the shortest distance in the Z direction between the voxel and the STL boundary of the part and a further buffer indicates the identity of those closest surfaces. This is repeated for each slice in build space 400.

The loading of Z buffers using graphical processing units is common in rendering 3D computer models of objects onto 2D planes. However, using such graphical processing units to load Z buffers associated with voxels as part of constructing three-dimensional parts has not been known.

After the −Z buffers have been formed for all of the slices in build space 400 the lowest slice in build space 400 is selected at step 9104. At step 9106, a rendering operation is performed in the +Z direction to load a +Z buffer for the selected slice. This rendering is identical to the rendering performed in the −Z direction with the exception that the view is changed to +Z direction 408. After step 9106, the selected slice has a +Z buffer value for each voxel and a −Z buffer value for each voxel where the +Z buffer value provides the shortest vertical distance between the voxel and the part in +Z direction 408 and the −Z buffer value provides the shortest distance between the voxel and the part in −Z direction 406.

Although steps 9102 and 9106 are described above with reference to one part in build space 400, in other embodiments, multiple parts are present in build space 400. When multiple parts are present in build space 400, a separate −Z buffer and a separate +Z buffer is created for each part for each slice in build space 400.

At step 9108, silhouette boundaries for the selected slice are determined from the +Z buffer(s). In particular, the +Z buffer values for pairs of voxels are examined to identify transitions from a negative value to the greatest magnitude negative value possible. Such transitions represent a boundary between where a portion of a part is above a voxel and no portion of the part is above the voxel's neighbor. An example of such a boundary can be seen in FIG. 14 where voxels 420 and 422 are positioned along such a boundary. Voxel 420 is positioned below part 402 and has a +Z buffer value of −4. Voxel 422, which neighbors voxel 420, is not below any portion of the part and as such has the largest possible negative value, for example −10000, in the +Z-buffer. Repeating this pairwise comparison for every pair produces silhouette boundaries, such as silhouette boundary 424 where voxels within the boundary are considered to be underneath a portion of the part and voxels outside of the silhouette are not below any portions of a part. Note that when multiple parts are present in build space 400, step 9108 is repeated for each +Z buffer for the slice selected at step 9104.

At step 9110, slice computations process 9210 determines the intersections of STL boundaries with the current slice. In FIG. 14, the intersection of the STL boundary and slice 400 is shown as boundary 430, shown in dotted lines. The intersection of the STL boundaries with the slice can be found by examining the +Z buffer and the −Z buffer to identify neighboring pixels where the Z buffer value changes from a negative value to a value of 0 or from a negative value to a positive value. Such changes in the Z-buffer values indicate a transition from being outside of the part to being within the part. Step 9110 is performed for each part's Z buffers.

At step 9112, a single voxel in the current slice is selected. At step 9114, a distance field value to the part's STL boundaries is determined for the voxel. This distance field value is the shortest magnitude distance between the voxel and any portion of the part's STL boundaries. At step 9116, if the current voxel is outside of the part, the distance to the silhouette boundary is determined for the current voxel.

In accordance with one embodiment, steps 9114 and 9116 are performed together using a sampling algorithm. One example of such a sampling algorithm is shown in the flow diagram of FIG. 15, which is explained with reference to FIG. 16. In FIG. 16, a top view of a slice 620 is shown with a matrix of voxels, including current voxel 600. An STL boundary 612 that intersects slice 600 is shown as a solid line and a silhouette boundary 610 is shown as a dotted line.

At step 500 of FIG. 15, the current voxel, voxel 600 of FIG. 16, is examined to determine if it is at an STL boundary in the current slice. For example, in FIG. 16, voxel 650 would be considered to be at STL boundary 612 since STL boundary 612 intersects with voxel 650. If the current voxel is at the STL boundary at step 500, the distance field value is set to 0 for the current voxel at step 502.

If the current voxel is not at the STL boundary at step 500, as is shown with current voxel 600 of FIG. 16, step 504 of FIG. 15 is performed where the distance field value for current voxel 600 is set to the smaller of the two Z-buffer values for the current voxel. In particular, the magnitudes of the Z distance value in the +Z-buffer and −Z-buffer are compared and the smaller magnitude is set as the distance field value for the current voxel. In addition, the sign of the distance field value is set based upon whether the voxel is inside or outside of the part. If the voxel is inside the part, the distance field value is set as a positive value and if the voxel is outside of the part, the distance field value is set to a negative value.

At step 506, a ring of voxels around the current voxel in the current slice is identified. For example, in FIG. 16, a first ring 602 indicated by the dotted shading surrounds current voxel 600. At step 508, a voxel in the identified ring is selected. If this selected ring voxel is at the STL boundary at step 510, the distance between the selected ring voxel and the current voxel 600 is used as a test distance. If the ring voxel is not at the STL boundary, a combination of the smaller of the two Z-buffer values for the ring voxel and the distance between the ring voxel and the current voxel is used to determine the test distance at step 514. In particular, the Z-buffer values in the +/−Z-buffer for the ring voxel are compared to each other and the smaller magnitude of the two Z-buffer values is selected as a vertical component of the distance to the part. A horizontal component of the distance of the part is computed as the distance between the ring voxel and the current voxel 600. Squaring the vertical component of the distance and the horizontal component of the distance, summing the squares, and taking the square root of the sum provides the distance between the current voxel 600 and the portions of the part above or below the ring voxel. Note that if no portion of the part is above or below the ring voxel, the Z-buffers will each contain large magnitude values.

The test distance value computed in either step 512 or 514 is then compared to the current stored distance field value for the current voxel 600 at step 516. If the test distance is less than the current distance field value, the test distance is set as the new current distance field value. If the magnitude of test distance is not less than the magnitude of the current distance field value, the current distance field value remains the same.

At step 518, the method determines if the ring voxel is at the silhouette boundary, such as silhouette boundary 610 of FIG. 16. If the ring voxel is at the silhouette boundary, a shortest distance to the silhouette boundary for current voxel 600 is set to the lesser of a previously stored distance to the silhouette boundary for current voxel 600 and the distance between the ring voxel and the current voxel at step 520. Thus, if the ring voxel is at the silhouette boundary and the distance between the ring voxel and the current voxel is smaller than previously identified distances between the current voxel and the silhouette boundary, the shortest distance between the current voxel 600 and the silhouette boundary is updated to reflect the distance between the ring voxel and the current voxel 600.

If the ring voxel is not at the silhouette boundary or after the distance to the silhouette boundary has been updated, the process of FIG. 15 determines if there are more ring voxels in the current selected ring. If there are more ring voxels, the process returns to step 508 and the next voxel in the current ring is selected. Steps 510-522 are then repeated. When all of the voxels in a current ring have been processed at step 522, the method determines if there are more voxels around the current ring at step 524. If there are more voxels around the current ring at step 524, the process returns to step 506 and the next ring around the current ring of voxels is selected. For example, after ring 602 is processed, ring 604 is processed, then ring 606, then ring 608. In processing successive rings, the STL boundaries are not crossed. As such, once an STL boundary is reached, voxels on the other side of the boundary are not processed. For example, voxel 652 is not processed as part of ring 608 since STL boundary 612 separates voxel 652 from current voxel 600. The same is true for rings of voxels that are processed within a part. Specifically, when a current voxel is located within a part, voxels outside of the part are not used to determine the distance field for the voxel.

When there are no more voxels around the current ring at step 524, the process ends and the distance field value stored for the current voxel is output as the final distance field 9212 (FIGS. 10 and 12). This distance field value will have a magnitude representing the shortest distance between the current voxel and any STL boundary of the part and a sign that will indicate whether the current voxel is within the part or is exterior to the part. In addition, when the distance field value is updated for the current voxel, one or more features associated with the distance field value are also stored such as the position of the closest point on the STL boundary, identifiers of the body or mesh that the closest point is located on, surface texture coordinates, and the surface normal at the closest point, for example. In accordance with one embodiment, different features of the part have different sets of material selection rules associated with them. As a result, different portions of the part can have different material selection rules associated with it. Similarly, the shortest distance to the silhouette boundary 9216 is output as is the location of the closest silhouette boundary point 9218.

When there are multiple parts in build space 400, the steps of FIG. 15 are repeated for each part to generate a distance field value 9212, a closest STL boundary point 9214, a closest distance to the silhouette 9216 and the closest silhouette boundary point 9218 for the voxel for each part. It is possible for a single voxel to be outside of all parts, to be located in a single part while outside of other parts, or to be located within multiple parts.

Returning to FIG. 11, after the distance field values and the distance to the silhouette boundary have been determined for the selected voxel at steps 9114 and 9116, respectively, material for the voxel is determined at step 9118 by a material selection unit 9226. FIG. 17 provides a flow diagram showing initial steps in performing the material selection.

At step 9700, the distance fields are examined to determine if the voxel is in at least one part. This determination can be made by determining if there is at least one non-negative distance field value stored for the voxel. If the voxel is in at least one part, all negative distance field values for the voxel are ignored at step 9702. Thus, if a voxel is located within at least one part, the material selection rules 9220 associated with the voxel being inside part(s) control the material selection and the material selection rules 9220 associated with the voxel being outside of other parts are ignored. Note that if there is only one part in the build space, there will be no negative distance fields to ignore at step 9702.

At step 9704, material selection unit 9226 determines if there are multiple parts in the build space. If there is only one part in the build space, a single-part material selection process is performed at step 9706. An example of one such single-part material identification process is discussed further below. If there are multiple parts at step 9704, a multipart material selection process is performed at step 9708. One example of such a multipart material selection process is discussed below.

Returning to step 9700, if the voxel is not in any of the parts in the build space, the voxel's position relative to the silhouette boundary is examined at step 9710 to determine if the voxel is in a direct support region for a part. A direct support region is a region in the build space located within a silhouette of a part. Such direct support regions require sufficient support material to support the part as it is built. Determining whether a voxel is in a direct support region involves looking at the +Z-buffer value(s) for the voxel. If any of the +Z-buffer value(s) is negative and has a magnitude less than the maximum magnitude, the voxel is in a direct support region. If the voxel is in a direct support region, a direct support designation is set at step 9712 for the voxel.

If the voxel is not in a direct support region at step 9710, the voxel's position is examined to determine if it is in an angled support region for the part at step 9714. For some parts, in addition to providing additional support in the direct support regions, additional support is also provided outside of the silhouette of the part so that the additional support has an angled surface and is not completely vertical. To determine if the voxel is in an angled support region for the part, the distance to the closest silhouette boundary for the part is combined with the vertical distance to the part from that closest point on the silhouette boundary to determine an angle between the voxel and the portion of the part above the silhouette boundary relative to the xy plane of the slice. If this angle is greater than some maximum angle set for the angled support region, the voxel is considered to be within the angled support region at step 9714. If the computed angled is less than the maximum angle for the angled support region, the voxel is considered to be outside of the angled support region for the part. If the voxel is within the angled support region at step 9714, a designation that the voxel is in the angled support region is set at step 9716. After step 9714 or step 9716, the process moves to step 9704 to determine if there are multiple parts in the build space.

FIG. 18 provides a diagram showing a full support region 800, an angular support region 802 and a fill support region 804 for a part 806. Full support region 800 includes areas outside of the part that are within silhouette boundary 810 of the part. Angular support region 802 includes areas that are within an angle 812 of point 814 of the part at silhouette boundary 810. Full support region 800, angular support region 802 and fill support region 804 can each include different materials and/or different modulating functions from each other. In general, full support region 800 will include materials and modulating functions that provide more support than fill support region 804. Angular support region 802 can include the same materials and modulating functions as full support region 800 or may include different materials or modulating functions.

FIG. 19 provides a flow diagram for performing step 9706 of FIG. 17 in which a material identification is performed with respect to a single part in the build space. At step 900 of FIG. 19, point features for the closest portion of the part to the voxel are retrieved from point features 9209 by material selection unit 9226. These point features are used to identify a set of material selection rules 9220 to be used when determining the material for voxels near the part portion. In accordance with one embodiment, the set of material selection rules contains a separate material selection rule 9224 for each of a set of ranges 9222 of distance field values. In accordance with some embodiments, each material selection rule is one of a static rule that assigns a same material at a same density across the entire range of distance field values, and a modulating rule that varies the composition of the voxels across the range of distance field values.

At step 902, material selection unit 9226 retrieves the sets of material selection rules identified in the point features and at step 904 uses the distance field and the region designation (i.e. direct support region, filler region), if any, for the voxel to identify which material selection rule to use.

In accordance with one embodiment, ranges 9222 describe bands of materials relative to the STL boundary where each band has an associated material selection rule 9224. Within a range 9222, the material selection rule 9224 can simply designate a single material to use within the range. For other ranges, the material selection rule 9224 consists of one or more functions that are evaluated to produce output values. Groups of output values are assigned to different material designations. For example, some output values of the functions can be assigned to a first material while other output values are assigned to a second material. Other times, one group of output values is assigned to a material while the remaining output values are assigned to no material, meaning that no material is placed in the voxel. For example, in accordance with one embodiment, the following bands and functions are defined:

for a>D>b
$f(\bar{x}, D)>0 \rightarrow$ material designation 1
$f(\bar{x}, D)<0 \rightarrow$ material designation 2
$f(\bar{x}, D)=0 \rightarrow$ material designation 3
b>D>0
$g(\bar{x}, D)>0 \rightarrow$ material designation 4
$g(\bar{x}, D)<0 \rightarrow$ material designation 5
$g(\bar{x}, D)=0 \rightarrow$ material designation 6
for D=0
$h(\bar{x}, D)>0 \rightarrow$ material designation 7
$h(\bar{x}, D)<0 \rightarrow$ material designation 8
$h(\bar{x}, D)=0 \rightarrow$ material designation 9
or 0>D>−c and direct support
$k(\bar{x}, D)>0 \rightarrow$ material designation 10
$k(\bar{x}, D)<0 \rightarrow$ material designation 11
$k(\bar{x}, D)=0 \rightarrow$ material designation 12
for 0>D>−c and angles support
$l(\bar{x}, D)>0 \rightarrow$ material designation 13
$l(\bar{x}, D)<0 \rightarrow$ material designation 14
$l(\bar{x}, D)=0 \rightarrow$ material designation 15
for 0>D>−c and nonshine
$m(\bar{x}, D)>0 \rightarrow$ material designation 16
$m(\bar{x}, D)<0 \rightarrow$ material designation 17
$m(\bar{x}, D)=0 \rightarrow$ material designation 18
for 0>D>−c and shine
$n(\bar{x}, D)>0 \rightarrow$ material designation 19
$n(\bar{x}, D)<0 \rightarrow$ material designation 20
$n(\bar{x}, D)=0 \rightarrow$ material designation 21
for −c>D>−d and direct support
$o(\bar{x}, D)>0 \rightarrow$ material designation 21
$o(\bar{x}, D)<0 \rightarrow$ material designation 22
$o(\bar{x}, D)=0 \rightarrow$ material designation 23
for −c>D>−d and angled support
$p(\bar{x}, D)>0 \rightarrow$ material designation 24
$p(\bar{x}, D)<0 \rightarrow$ material designation 25
$p(\bar{x}, D)=0 \rightarrow$ material designation 26
for −c>D>−d and otherwise
$q(\bar{x}, D)>0 \rightarrow$ material designation 27
$q(\bar{x}, D)<0 \rightarrow$ material designation 28
$q(\bar{x}, D)=0 \rightarrow$ material designation 29 where D is the distance field value, a, b, −c and −d are range values for the distance field values, $\bar{x}$ is the three-dimensional location of the voxel in the build space, $f(\bar{x}, D)$, $g(\bar{x}, D)$, $h(\bar{x}, D)$, $k(\bar{x}, D)$, $l(\bar{x}, D)$, $m(\bar{x}, D)$, $n(\bar{x}, D)$, $o(\bar{x}, D)$, $p(\bar{x}, D)$, and $q(\bar{x}, D)$ are modulating functions and material designations 1-29 are possible materials and no materials to be used for the voxel. Although listed as separate materials 1-29, those skilled in the art will recognize that one or more of the material designations may be the same.

The modulating functions can be periodic or aperiodic functions of one or more features of the voxel such as the voxel's position in the build space, or the distance field D for the voxel. For periodic functions, the position in the build space or the distance field or a combination of these two values can be used to control the frequency of the periodic function, a temporal shift in the periodic function and/or the magnitude of the periodic function. The modulating function can also be a noise function based on the voxel's position in the build space or based on the distance field. In further embodiments, the modulating function is a combination of a periodic function and a noisy function. For example, in one embodiment, the periodic function is based on both the position in the build space and the distance field and the output of the periodic function is filtered by a noisy filter based on the voxel's position in the build space. In a still further embodiment, the modulating function is the sum of the distance field value and a base periodic function of the voxel position in the build space.

In the examples above, three ranges of values for the functions have been described with three associated material designations. When the modulating function provides a constant value, only a single material will be identified producing a band of solid material across the range set by the distance field. In other embodiments, other ranges of values for output of the modulating function are used allowing for any number of materials to be used within the range of distance field values set for the modulating function. In further embodiments, one or more of the ranges of values for the modulating function can be associated with empty space resulting in no material being assigned to the voxel. For example, it is possible to assign a material when the output of the modulating function is greater than or equal to 0 and to assign an empty space to the voxel when the output of the modulating function is less than 0. This allows a porous band of material to be constructed with the porosity of the material changing as a function of the distance field and/or the position in the build space.

The frequency of the modulating function can change as a continuous function of the distance field or can be fixed at the value of the distance field at the beginning or the end of the range of distance fields associated with the modulating function. Similarly, the amplitude of the modulating function can similarly vary continuously as a function of the distance field values or can be set to the value of the distance field at the beginning or ending range of distance field values associated with the modulating function.

As shown in the example set of material selection rules above, the selection of a material selection rule can also be based upon whether the voxel is located in a direct support region or an angled support region as designated for the voxel in step 9712 and 9716 above. In addition, shine maps 9208 can be consulted for the portion of the part closest to the voxel to determine whether that portion of the part is to have a particular shine level. This shine level can then be used together with the distance field to select the material selection rule to apply to the voxel.

Returning to FIG. 19, at step 906, the distance field value of the voxel and/or the build space position of the voxel are applied to the selected material selection rule to select a material or no material for the voxel. In some embodiments, as shown above, the material selection rule 9224 is a function of a feature of the voxel, such as the distance field value or the build space position of the voxel, and the distance field value and or the build space position of the voxel are applied to the function to generate an output value that is then used to select the material or lack of material for the voxel.

If there is more than one part in the build space, a multipart material selection is performed at step 9708 of FIG. 17. FIG. 20 provides a flow diagram of one method for performing a multipart material selection.

At step 1000, material selection unit 9226 accesses point features 9209 to retrieve the features for the closest STL boundary points 9214 for the multiple parts. These features are then used to determine whether the material selection rules designated for the STL boundary point are to be blended with the material selection rules for STL boundary points of other parts or whether a selection is to be made between the material selection rules of the various parts so that only a single part's material selection rules are used.

If only a single part's material selection rules are to be used, the process continues at step 1002 where one of the parts is selected using the closest STL boundary points of the various parts. In particular, the features 9209 of the closest STL boundary points will indicate which of the parts is to be given priority when selecting a set of material selection rules. After the part with priority has been selected at step 1002, single part material selection is performed at step 1004 using the process described above for FIG. 19.

FIG. 21 provides an example of a top cross-sectional view of a part constructed using the single part construction process of FIG. 19. In FIG. 21, the part is defined by an STL boundary 1100 that is divided into two regions 1102 and 1104, each having respective features. For region 1102, three bands of material selection rules are defined outside of the part and four bands of material selection rules are defined inside the part. In particular, outside of the STL boundary there is a band 1106 constructed by a modulating function that modulates between producing two different materials resulting in a support area with structure. Band 1108 includes an aperiodic modulating function that provides a constant amount of a single support material. Band 1110 consists of an aperiodic modulating function that assigns an air gap to the voxels in the band. Within the STL boundary, band 1112 is represented by an aperiodic modulating function that provides a constant density coating material. Band 1114 is described by a modulating function that modulates between the coating of band 1112 and a cortical material found in a cortical band 1116. Cortical band 1116 has a varying thickness as indicated by wider thickness 1118 and narrower thickness 1120. Thus the size of cortical band 1116 varies based on what is the closest STL boundary point. Cortical band 1116 is described by an aperiodic modulating function that provides a constant intensity cortical material. Band 1122 is described by a noisy modulating function that modulates between the cortical material of band 1116 and a marrow material. The noisy function increases the amount of marrow material as the distance field increases.

Region 1104 contains bands 1106 and 1108 from the exterior of region 1102 but only includes interior band 1122 from region 1102.

Returning to FIG. 20, when the point features 9209 for the closest part points indicate that the material selection rules of two different parts are to be blended at step 1000, the process continues at step 1006. In step 1006, at least two of the parts in the build space are selected. The number of parts that are selected is based on designations stored in point features 9209 for all of the parts in the build space. Such features can include threshold distance fields that require the voxel to be within a certain distance of the STL boundary in order for the part's material selection rules to be used during blending. In other embodiments, certain point features 9209 will indicate that a part's material selection rules are only to be blended when a certain number of other parts are present in the build space.

At step 1008, material selection rules 9220 associated with the parts selected at step 1006 and identified in point features 9209 are retrieved. At step 1010, the respective distance field of the voxel and region designation, if any, of the voxel relative to each part selected at step 1006 are used to identify which material selection rules are to be selected for blending. At step 1012, one or both of materials and modulating functions of the selected material selection rules are blended or merged. In accordance with one embodiment, blending or merging modulating functions involves weighting the modulating functions using the distance fields and summing or multiplying the weighted modulating functions to form a merged function. The weighting is such that if a voxel is within two parts, the weight for a modulating function of one of the parts increases as the distance field value for that part increases. When the voxel is located outside of two parts, the opposite is true and the weighting for the modulating function relative to a part decreases as the magnitude of the distance field for the part increases. In other embodiments, the blending or merging is performed by using a random function and selecting which material to apply based on whether the output of the random function is above or below a threshold. The threshold is set as a function of the distance field for one of the parts, such that it becomes more likely that a material of a particular part will be selected for the voxel as the distance field for that part increases. This produces a merged area across the overlapping portions of the two parts where the material content of the voxels changes gradually across the merged area.

After the material/modulating functions have been blended at step 1012, the distance fields for one or more of the parts are applied to the blended functions at step 1014 along with the build space region for the voxel to produce a computed value that is then used to select the material for the voxel at step 1016.

FIG. 22 provides an example of multiple part material selection in which selecting a single part at step 1002 removes interference between parts. At times, meshes 9202 for different parts will be described such that the parts overlap when the designer intended the parts to be separate. Such interference can be time consuming to remove. Under step 1002, such interference is automatically eliminated by selecting only one of the parts when a voxel is described by meshes 9202 as being in two different part.

In the example of FIG. 22, there are two parts 1200 and 1202. Dotted lines 1204 indicate the STL boundary for part 1202 as described by meshes 202 and solid line 1205 indicates the STL boundary for pat 1200. As shown in FIG. 22, STL boundary 1204 is within part 1200 and as such, the description of the STL boundaries shows an interference between parts 1200 and 1202. By selecting a single part at step 1002, in this case, part 1200, it is possible to remove the interference described in the meshes 202 to provide a new part boundary 1206 (shown in bold) for part 1202. Thus, in interference area 1208 where parts 1200 and 1202 overlap, the selection of part 1200 at step 1002 effectively shifts boundary 1204 to boundary 1206 for part 1202, thereby eliminating the interference between the two parts.

FIG. 23 provides an example of blending two modulating functions using a distance field. In FIG. 23, a gyroid modulating field shown in section 1300 is blended with a Schwartz lattice as shown in section 1302 across a blending area 1304. In the blending of FIG. 23, the two modulating functions are weighted such that as the distance field from the STL boundary defining the gyroid increases, the gyroid modulating function is weighted less and the Schwartz lattice is weighted more. This produces a smooth transition from the gyroid lattice to the Schwartz lattice.

FIG. 24 shows the blending of parts material across an overlapped portion of two parts 1400 and 1402. In blended region 1404, the amount of material associated with part 1400 gradually decreases and the amount of material associated with part 1402 gradually increases along the extent from part 1400 to part 1402. Thus, as the magnitude of the distance field for part 1400 decreases, the amount of part material for part 1400 decreases in the blended region. Similarly, as the distance field for part 1402 decreases along the blended region 1404, the amount of material associated with part 1402 decreases in the blended region.

Returning to FIG. 11, after the material for a voxel has been determined at step 9118, the process determines if more voxels need to be processed at step 9120. If there are more voxels in the current slice, a new voxel is selected by returning to step 9112 and steps 9114, 9116, and 9118 are repeated for the new voxel. When all of the voxels for the current slice have been processed at step 9120, the material bitmap for the slice is complete and is output as material bitmap 9228. At step 9122, the process determines if there are more slices. If there are more slices, slice computations process 9210 moves up one slice at step 9124 and then returns to step 9106 to perform rendering operations in the +Z direction for the new slice. Steps 9108, 9110, 9112, 9114, 9116, 9118, and 9120 are then repeated for the new slice. Note that although the selection of materials for each voxel in a slice has been indicated as being performed before the +Z-buffer is loaded for each slice, and other embodiments, the rendering operation is performed in the +Z direction for each slice before determining materials for the voxels in any of the slices. After the +Z-buffers have been loaded for each slice, each slice is processed in turn by material selection unit 9226 to identify the material for each voxel in the slice.

After material bitmaps 9228 have been formed for each slice, a print conversion unit 9230 performs a print conversion step 9126 to form print instructions 9237. This print conversion step can be as simple as transferring material bitmaps 9228 as bitmaps 9232. In other embodiments, material bitmaps 9228 are converted into toolpaths 9234 that describe how a print head should be moved along a slice to deposit material. In one embodiment, a marching square algorithm is used to identify toolpaths 9234 from bitmaps 9228. In a further embodiment, the material bitmaps 9228 for each slice is converted into meshes 9236 that provide three-dimensional descriptions of part boundaries. Such meshes can be applied as input to other printers or as input to CAD systems. In one embodiment, a marching cubes algorithm is used to identify meshes 9236 from bitmaps 9228. After the material bitmaps 9228 have been converted into print instructions 9237, the print instructions are communicated through communication adapter 9092 so that the part can be manufactured at step 9128.

The embodiments above can thus load a CAD model onto a GPU, use the GPU to compute signed distance fields for every voxel, assign a material to each voxel based on the signed distance fields, and outputs images suitable for printing.

The various embodiments compute several different distance fields for each voxel in a slice, including the 3D Euclidean distance to the closest point of the CAD model, the 2D distance to the closest point on the cross section of the model in the slice, and the 2D distance to the silhouette of the model.

Each distance field may include feature transform information for the voxel, where the feature is the source point on the model used to record the distance reported for that voxel in the distance field. Feature transforms may include identifiers of the body or mesh, surface texture coordinates, surface normal, and position of the source point.

In accordance with one embodiment, the material assignment to each voxel becomes a function of the distance information and user-controlled parameters.

The distance metric may be Euclidean norm or a different norm, such as a $L^p$ or a chamfer norm.

The computations on the GPU use the Z-buffer to produce the depth component of distance in planar projections.

The computations on the GPU use a distance transform to compute 3D distance, 2D sectional distance, or distance from self-supporting regions.

The distance fields can be used to modulate carrier functions, such as implicit lattices and noise functions, to produce structures with varying compliance and porosity.

The distance fields can be used to perform offsetting and boolean operations.

The distance fields can be used to smoothly interpolate from one CAD model to another.

The distance fields can be used to adjust interferences and gaps between parts.

The distance fields can be used to create variable thickness offsets.

The distance fields can be combined with surface and volumetric textures to create layered and rippled textures.

The distance fields can be combined with voxel data, such as CAT scan and MRI data to produce models with volumetrically varying material properties.

The results can be saved as bitmap images for use for printers that use images.

The results can be traced into vector contours for 3D printers that use toolpaths.

The results can be reconstructed into 3D solid models.

The computations on the GPU use convolution or sampling to compute 2D sectional distance, silhouette distance, and the planar components of 3D distance. In accordance with one embodiment, these computations are performed iteratively to recursively compute distances efficiently.

The distance information can be used to modulate explicit and implicit functions, such as those describing lattices, to produce structures with varying bulk material properties such as compliance and porosity. The functions may describe shapes, voids in shapes, textures, varying material properties, and beam-like, honeycomb, and mixed topology lattices.

In the embodiments described below, there are CPU and GPU components. The CPU component:

1. Reads mesh data, textures, and slicing parameter data.
2. Sends the mesh data and related information to the GPU.
3. Provides a user interface to view and interact with the slice data.
4. Saves images created on the GPU to disk.

The GPU component:

1. Produces depth information about the model using the Z-buffer.
2. Combines the depth information into structures with different distance information.
3. Calculates the composition of each voxel using the distance information.
4. Includes libraries for calculating lattices, performing solid modeling operations, calibrating color, etc.

In one embodiment, the various embodiments are implemented using Javascript, Node.js and Electron for the CPU and OpenGL ES for the GPU code. Other embodiments are implemented using C# on .NET or Mono and OpenGL 3.3.

Additional Applications:

1. Recording texture, normal, and other geometric information (collectively, "Surface Information") along with distance information while computing the distance field.
2. Using Surface Information and a bitmap to choose a color to assign to the model.
3. Using Surface Information and a bitmap to choose a material among several possible materials, possibly using dithering.

4. Using Surface Information and a bitmap to offset the model to create a physical displacement map.

5. Using Surface Information and a bitmap to change the glossiness of the printed result.

6. Using Surface Information and a bitmap to change the surface finish of the printed result.

7. Using Surface Information and a bitmap to change the hardness of the material closest to the value of the texture on the surface.

8. Using Surface Information and a bitmap to change the transparency of the material closest to the value of the texture on the surface.

9. Using Surface Information and a bitmap to change the mechanical properties, such as stiffness, of the material closest to the value of the texture on the surface.

10. Using Surface Information and a bitmap to alter the presence of support material on the surface of a part.

11. Using Surface Information and a bitmap to modulate implicit functions used in the volume of the part or in support structures surrounding it.

12. Using Surface Information and several bitmaps to produce several displacement maps that can be combined via Boolean operations to create surface textures that include overhang.

13. Using Surface Information and several bitmaps with transparent material to produce lenticular (animated or 3D) surface effects.

14. Using any combination of 2-9 together.

15. The use of 3D volumetric textures with distance field information to change material location composition, possibly in combination with 2-9.

In FIG. 9A, computer 9066 was shown as a host for a single stand-alone additive manufacturing system. Alternatively, as shown in FIG. 9B, computer 9066 may function as a local server for multiple additive manufacturing systems 9068. For example, systems 9068 may be part of an overall production system to manufacture consumer or industrial OEM products. As such, computer 9066 and may perform the steps of FIG. 11 and may also perform one or more additional processing steps, such as run-time estimates, printer queuing, post-processing queuing, and the like. As shown, computer 9066 may optionally include one or more servers 9072 and one or more dedicated host computers 9074 associated with each system 9068, where server 9072 may communicate with host computers 9074 over one or more communication lines 9076 (e.g., network lines).

In yet another embodiment, as shown in FIG. 9C computer 9066 and systems 9068 may be part of an on-demand service center. In this embodiment, computer 9066 may function as a cloud-based server, for example, where customers may submit digital models (e.g., STL data files) from their personal computers 9078 over the Internet via one or more network or communication lines 9080 to computer 9066 (e.g., to server 9072).

In this application, computer 9066 may perform the steps of FIG. 11 as well as one or more additional processing steps, such as support material volume calculations, price quoting, run-time estimates, printer queuing, post-processing queuing, shipping estimates, and the like. For example, in some embodiments, computer 9066 may generate support material volume calculations, build times, and price quoting as discussed in Nehme et al., U.S. Pat. No. 8,818,544. The service center may also include one or more post-printing stations (e.g., support removal stations, surface finishing stations, shipping stations, and the like, not shown), where computer 9066 may also optionally communicate with the post-printing station(s).

According to some embodiments of the invention there is provided a method comprising: selecting a voxel in a three-dimensional build space; for the selected voxel, determining a distance field value relative to a three-dimensional part in the three-dimensional build space; using the distance field value to select at least one material selection rule; applying a feature of the voxel to the at least one material selection rule to identify a material designation for the voxel, wherein the material designation indicates no material is to be placed at the voxel when the material selection rule identifies no material for the voxel and wherein the material designation indicates at least one material is to be placed at the voxel when the at least one material selection rule identifies the at least one material for the voxel; and outputting the material designation for the voxel for use in building the three-dimensional part using an additive manufacturing system.

According to some embodiments of the invention the method uses the shortest distance to determine the distance field value.

According to some embodiments of the invention the distance field value is in a first range of values if the voxel is outside of the part, is in a second range of values if the voxel is within the part and is a singular value if the voxel is on the boundary of the part.

According to some embodiments of the invention the voxel forms part of a lattice structure.

According to some embodiments of the invention the using the first distance field value and the second distance field value to set a material designation comprises using the first distance field value to identify a first function, using the second distance field value to identify a second function, merging the first function with the second function to form a merged function, and using the merged function to set the material designation.

According to some embodiments of the invention the first function describes a first lattice pattern, the second function describes a second lattice pattern and the merged function describes a transition lattice that transitions from the first lattice pattern to the second lattice pattern over a merge area.

According to some embodiments of the invention the using the first distance field value and the second distance field value to set a material designation comprises using the first distance field value to determine that the voxel is inside the first three-dimensional part, using the second distance field value to determine that the voxel is inside the second three-dimensional part and setting the material designation for the voxel to a material set for the first three-dimensional part instead of a second material set for the second three-dimensional part.

According to some embodiments of the invention the setting the material designation for the voxel to the material set for the first three-dimensional part instead of the second material set for the second three-dimensional part comprises identifying a closest portion of the first three-dimensional part to the voxel, retrieving a feature associated with the closest portion, and using the feature to decide to set the material designation for the voxel to the material set for the first three-dimensional part.

Example 2

Generation of Distance Map Using Linear Scans

FIGS. 25A and 25B show an input image (FIG. 25A), and a corresponding distance map (FIG. 25B) generated by two independent linear scans along the x and y axes according to embodiments of the present invention. The image size of FIG. 25A was 2176×1040 pixels (about 2.26 megapixels), and the processing time for generating the map in FIG. 25B, using a single thread image processing, was about 80 ms, namely about 28 megapixels per second.

The objective function that was used was the objective function in EQ. 1. The process used is explained in greater detail with reference to FIGS. 26A and 26B. The curve in FIG. 26A corresponds to the formed distance map after a particular iteration. For picture-element p, picture-element q is such that the objective function F (EQ. 1) is minimal. The thick line exemplifies all picture-element p for which the objective function F is minimal.

It is appreciated that for a particular axis (e.g., the x axis) the function F is quadratic in the coordinate along the axis (e.g., the x coordinate), and therefore corresponds to a set of parabolas in the form $P_i(x)=g_i(x)+(x-i)^2$, where for the case of a scan along the x axis, the subscript i represents a column number. An exemplified set of parabolas is illustrated in FIG. 26B. During the scan, the map-elements are updated by selecting the lowest parabola. In FIG. 26B, the parabolas for column Nos. 0, 47, 109 and 256 were already selected. Two parabolas are illustrated for column 259: $P_{259(a)}$ and $P_{259(b)}$, and the lowest parabola $P_{259(a)}$ was selected for this column. The intersecting points between the parabolas of column 259 and column 256 are shown by filled circles.

Figure 27A:
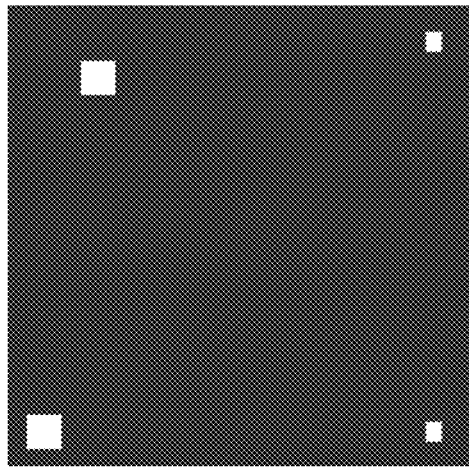
Figure 27B:
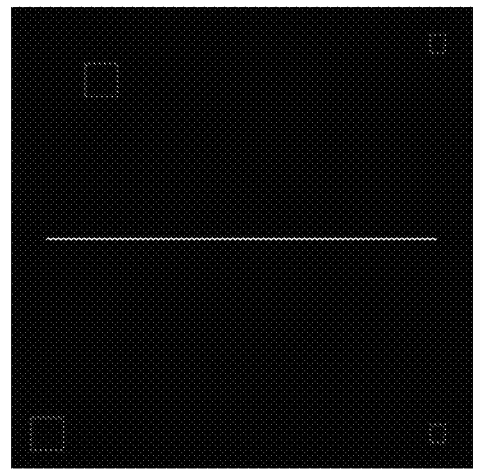
Figure 27C:
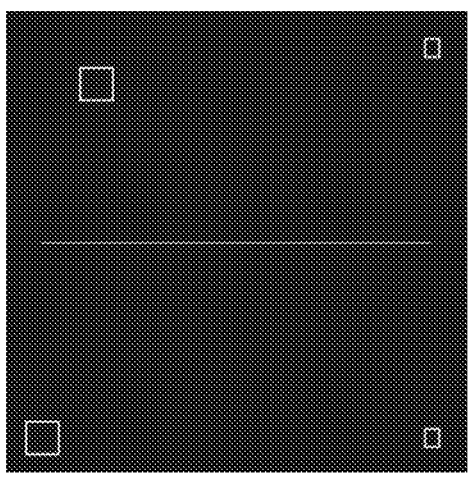
Figure 27D:
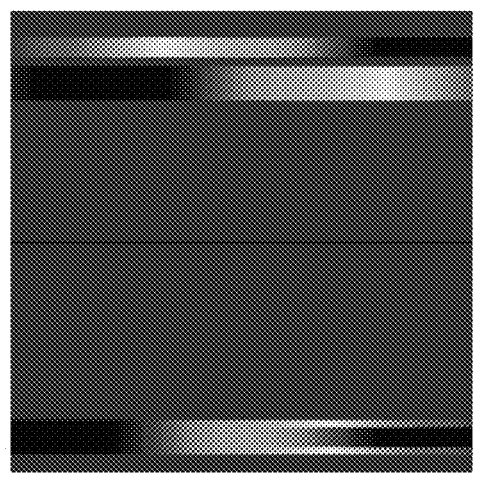
Figure 27E:
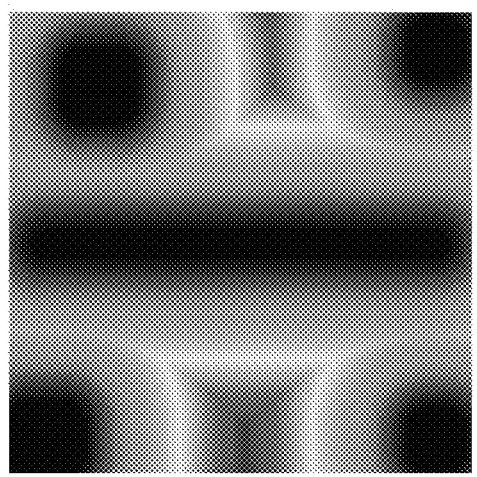

FIGS. 27A-E show the result of the method when applied to a three-dimensional image having 4 squares at ground level (height 0) and a horizontal bar along the x axis, one voxel in width, at a distance of 10 voxels above the ground level. FIG. 27A shows the slice image, FIGS. 27B and 27C show the edges and height map, FIG. 27D shows the result after a scan along the x axis, and FIG. 27E shows the distance map obtained after a scan along the x axis and a scan along the y axis.

Example 3

Generation of Closest Point Map Using Linear Scans

A method similar to the method described in Example 2 can also be used for generating a closest point map. A graphical illustration of such a map is shown in FIG. 28, where each point of the object (the object being a discrete set of points in this simplified example) is associated with a different color, and where all points that are closest to a particular point of the object are shown using the color associated with the particular point. The object's points are emphasized as filled triangles.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of rendering data for addressable dispensing of material over a working surface, the method comprising:
receiving input image data arranged grid-wise over a grid of picture-elements;
generating an initial map describing a distance field perpendicular to the working surface and having a plurality of map-elements each storing distance information corresponding to one picture-element;
for each picture-element of at least a portion of said picture-elements:
linearly scanning said map independently along a first axis and along a second axis, and updating a respective map-element based on values of map-elements visited during said scan, and designating a material to be dispensed based at least in part on said respective map-element, wherein said designating is according to a modulating function selected from the group consisting of a noise function, a simplex noise function, an open simplex noise function, a Worley noise function, a Perlin noise function, a wavelet noise function, a periodic function and an aperiodic function.

2. The method of claim 1, wherein said generating said initial map is by a first processor, and said scanning and said updating is by a second processor.

3. The method of claim 2, wherein said first processor is a graphics processing unit (GPU) and said wherein said second processor is a central processing unit (CPU) of the same computer system.

4. The method according to claim 1, wherein said first and said second axes are orthogonal axes.

5. The method according to claim 1, wherein said distance information is according to a taxicab metric.

6. The method according to claim 1, wherein said distance information is according to a Euclidian metric.

7. The method according to claim 1, wherein said grid is a two-dimensional grid describing coordinates of picture-elements of a two-dimensional image.

8. The method of claim 7, wherein said generating said initial map comprises setting one of two predetermined values for each map-element, wherein a first value of said two predetermined values is set when a respective picture-element is on a boundary of an object in said image, and a second value of said two predetermined values is set otherwise.

9. The method according to claim 1, further comprising, for each picture-element of at least a portion of said picture-elements, designating a material to be dispensed based at least in part on a respective map-element, generating dispensing instructions readable by a controller of a printer based on said designation and transmitting said dispensing instructions to said controller.

10. The method according to claim 1, wherein said grid is a three-dimensional grid describing coordinates of picture-elements of a three-dimensional image.

11. The method of claim 10, wherein said generating said initial map comprises setting, for each map-element, a value corresponding to a height of a respective picture-element in said image, said height being along a third axis perpendicular to both said first and said second axes.

12. The method according to claim 10, further comprising, generating dispensing instructions readable by a controller of a printer, based on said designation, and transmitting said dispensing instructions to said controller.

13. The method according to claim 10, further comprising slicing said input image data, wherein said generating, said scanning and said updating are executed separately for each slice, to form a sub-map corresponding only to picture-element of said slice.

14. The method according to claim 10, further comprising, for at least one sub-map, designating, for each picture-element of at least a portion of picture-elements corresponding to said sub-map, a material to be dispensed based at least in part on a respective map-element of said sub-map, generating dispensing instructions readable by a controller of a printer based on said designation, and transmitting said dispensing instructions to said controller.

15. The method according to claim 14, wherein said dispensing instructions comprise a material bitmap having a plurality of bitmap-elements, each storing information pertaining to a material to be dispensed, and the method further comprising purging said sub-map from a memory following said generation of said material bitmap.

16. A method of additive manufacturing an object, the method comprising:
   executing the method according to claim 12; and
   dispensing and solidifying a plurality of materials based on said dispensing instructions to sequentially form a plurality of hardened layers in a configured pattern corresponding to a shape of an object.

* * * * *